United States Patent [19]
Hamanishi

[11] 4,392,724
[45] Jul. 12, 1983

[54] LENS SYSTEM CAPABLE OF SHORT DISTANCE PHOTOGRAPHY

[75] Inventor: Yoshinari Hamanishi, Tokyo, Japan
[73] Assignee: Nippon Kogaku K.K., Tokyo, Japan
[21] Appl. No.: 226,011
[22] Filed: Jan. 19, 1981
[30] Foreign Application Priority Data Jan. 31, 1980 [JP]  Japan ............................ 55/10704

[51] Int. Cl.³ .......................... G02B 9/64; G02B 15/14
[52] U.S. Cl. .................................................... 350/163
[58] Field of Search ........................................ 350/463
[56] References Cited
U.S. PATENT DOCUMENTS 3,942,875  3/1976  Betensky ............................ 350/463
3,942,876  3/1976  Betensky ............................ 350/255

*Primary Examiner*—John K. Corbin
*Assistant Examiner*—Rebecca D. Gass
*Attorney, Agent, or Firm*—Shapiro and Shapiro

[57] ABSTRACT

Compact lens systems capable of continuously effecting infinity photography to high magnification proximity photography and having a large aperture ratio and excellent imaging performance comprise, in order from the object side, a first convergent lens group, a second convergent lens group including a diaphragm, and a third divergent lens group. The first and second groups are movable toward the object side relative to the third group, while enlarging their spacing, when focusing is effected from infinity to a short distance.

10 Claims, 19 Drawing Figures

LENS SYSTEM CAPABLE OF SHORT DISTANCE PHOTOGRAPHY

BACKGROUND OF THE INVENTION

1. Field of the Invention

This invention relates to a lens system which is capable of continuously effecting infinity photography to high magnification proximity photography.

2. Description of the Prior Art

So-called microlenses or macrolenses are known as lenses for short distance photography, but they have been limited to dark lenses in which the fluctuation of various aberrations is great between infinity photography and short distance photography and which have a small aperture ratio. Recently, to prevent the deterioration of aberrations in short distance photography, various aberration correcting techniques such as the floating system have been proposed with very successful results, but such techniques involve a great amount of movement of the lens for short distance focusing and lack operability. Moreover, the amount of movement for focusing increases in proportion to the focal length and therefore, particularly, in order to effect high magnification short distance photography with a telephoto lens, a large movement has been necessary and the construction of the lens barrel has unavoidably been bulky.

Also, as disclosed in Japanese Laid-open Patent Application No. 38138/1973, (corresponding to U.S. Pat. No. 3,942,875 and U.S. Pat. No. 3,942,876) there is known a lens system in which the entire system comprises two groups and the positive forward group is axially moved to thereby effect high magnification short distance photography, but in this lens system, the rearward group merely has the function of correcting the aberration fluctuations at short distances and the refractive power thereof is small. Therefore, the amount of movement of the forward group has unavoidably been large, as in the case of a whole axial movement system.

SUMMARY OF THE INVENTION

It is an object of the present invention to provide a lens system capable of short distance photography in which the amount of movement of the lens for focusing is small even in very short distance high magnification photography and which has a relatively large aperture ratio and yet has excellent imaging performance over a wide range from infinity to a short distance.

The invention will become fully apparent from the following detailed description thereof taken in conjunction with the accompanying drawings.

DESCRIPTION OF THE PREFERRED EMBODIMENTS

Figure 1:
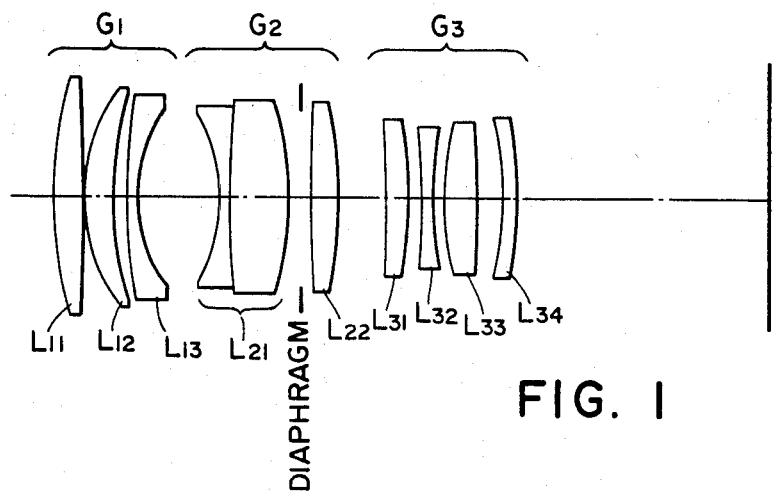
FIGS. 1, 3, 5, 7, 9 and 11 respectively show the lens constructions of first, second, third, fourth, fifth and sixth embodiments of the present invention in infinity photography condition.

A lens system capable of short distance photography according to the present invention comprises, in succession from the object side, a convergent lens group $G_1$ which is a first group, a convergent lens group $G_2$ which is a second group, a divergent lens group $G_3$ which is a third group, and a diaphragm provided between the first group and the third group. When focusing is effected from infinity to short distances, the first and second groups are moved toward the object side relative to the third group while the spacing between the first and the second group is increased.

In such construction of the present invention, the third group which is most adjacent to the image side is a negative lens group and thus, a kind of telephoto type lens system is provided. This is not only advantageous to reduce the length of the entire lens system but also the combined focal length of the first and second groups is shorter than that of the entire system and the amount of movement of the first and second groups for focusing can be made considerably smaller than in the case of the whole axial movement system heretofore commonly adopted. Moreover, the Petzval sum can be well balanced by the diverging action of the third group and flatness of the image plane can be maintained. Further, in the present invention, the spacing between the first and the second group becomes greater as the photographing distance becomes shorter and, therefore, fluctuation of aberrations between infinity photography and short distance photography can be sufficiently suppressed.

Now, let f be the focal length of the entire system and $f_1$, $f_2$ and $f_3$ be the focal lengths of the first, the second and the third group, respectively. Let $f_{12}$ be the combined focal length of the first and second groups, and $\beta_3$ be the magnification borne by the third group in infinity photography. Also, let $D_1$ be the distance between the principal points of the first and second groups, F be the F-number of the entire system, and $F_{12}$ be the combined F-number borne by the first and second groups. Then, these are in the following relations:

$$f = f_{12} \cdot \beta_3 \quad (1)$$

$$f_{12} = 1/f_1 + 1/f_2 - D_1/f_1 f_2 \quad (2)$$

$$F = F_{12}\beta_3 \quad (3)$$

As seen from equation (3), if an optical system is to have a large aperture ratio, either $F_{12}$ may be made small to make the combined system of the first and second groups bright or the magnification $\beta_3$ of the third group may be made small. In fact, there is a limit on making $F_{12}$ small and, therefore, if it is desired to provide the entire system with a large aperture ratio, making $\beta_3$ small will ease correction of aberrations but this will be disadvantageous in making the amount of movement of the lens for short distance focusing small.

On the other hand, making the magnification $\beta_3$ of the third group large is effective to make small the amount of movement of the first and second groups relative to the third group for focusing, but the aberrations of the first and second groups are increased by this magnification and therefore, it is essential to put the first and second groups into a bright condition of use and pre-correct the fluctuation of aberrations in these groups. In the case of the present invention, in short distance photography conditions, at least one of the positions of the entrance pupil and the exit pupil is more distant from the foremost or the rearmost surface of the lens system than the positions in an infinity photography condition and the angle formed by the light ray with respect to the optical axis is smaller, and this is advantageous in the correction of aberrations.

In such basic property of the present invention, it is desirable to construct the lens system such that during the nearest distance photography, the light beam from the object point on the optical axis because a slightly divergent light beam after having passed through the first group. If the light beam becomes a sharply divergent light beam, the burden of the second group will become excessive and it will be difficult to suppress the occurrence of annular spherical aberration and astigmatism. The photographing magnification of the entire system when the light beam between the first and the second group begins to become a divergent light beam depends on the refractive power (the inverse number of the focal length) of the first group. Accordingly, if the refractive power of the first group is intensified, proximity photography at higher magnification will become possible. However, correction of aberrations and maintenance of the brightness of the first group will be difficult and, therefore, in order to provide a lens system having enhanced photographing magnification while maintaining the brightness of the entire system, it is necessary to select the refractive power of each group appropriately.

As far as the above-described refractive power distribution in each group is concerned, it is desirable that the following conditions be satisfied:

$$1.1 < f/f_{12} < 2.2 \quad (4)$$

$$1.7 < f_1/f_{12} < 4.0 \quad (5)$$

$$1.6 < f_1/f_2 < 5.0 \quad (6)$$

$$0.15 < dy/dx < 0.6 \quad (7)$$

where $dy/dx$ represents the differentiated value of the functional relation $y=f(x)$, where y is the amount of variation in the spacing between the first and the second groups and x which is the amount of variation in the spacing between the second and the third groups.

Condition (4) is one of which prescribes the ratio of the combined refractive power of the first and second groups to the refractive power of the entire system. If the lower limit of this condition is exceeded, correction of aberrations will be easy but the compactness of the system will be lost and, when focusing is effected at near distance, the amount of axial movement will be about the same as that in the whole axial movement system; this is not desirable. Also, the lower limit being exceeded means that the third group has very little refractive power, and a large aperture ratio may be provided, but correction of the flattening of the image plane will become difficult. If the upper limit of this condition is exceeded, compactness of the system will be obtained but the lens system will become a dark lens. Also, the amount of axial movement during focusing will be reduced, but the telephoto ratio (the ratio of the distance from the foremost surface of the lens system to the image plane to the focal length) will be made too small and therefore, a large aperture ratio will be provided and correction of aberrations will become difficult. Annular spherical aberration, astigmatism and curvature of image field, especially, will be significantly increased and it will become impossible to expect a high performance.

To explain conditions (5) and (6), equation (2) may be re-expressed as follows:

$$f_1/f_{12} = 1 + (1 - D_1/f_{12})/(f_2/f_{12} - 1) \quad (8)$$

Figure 13:
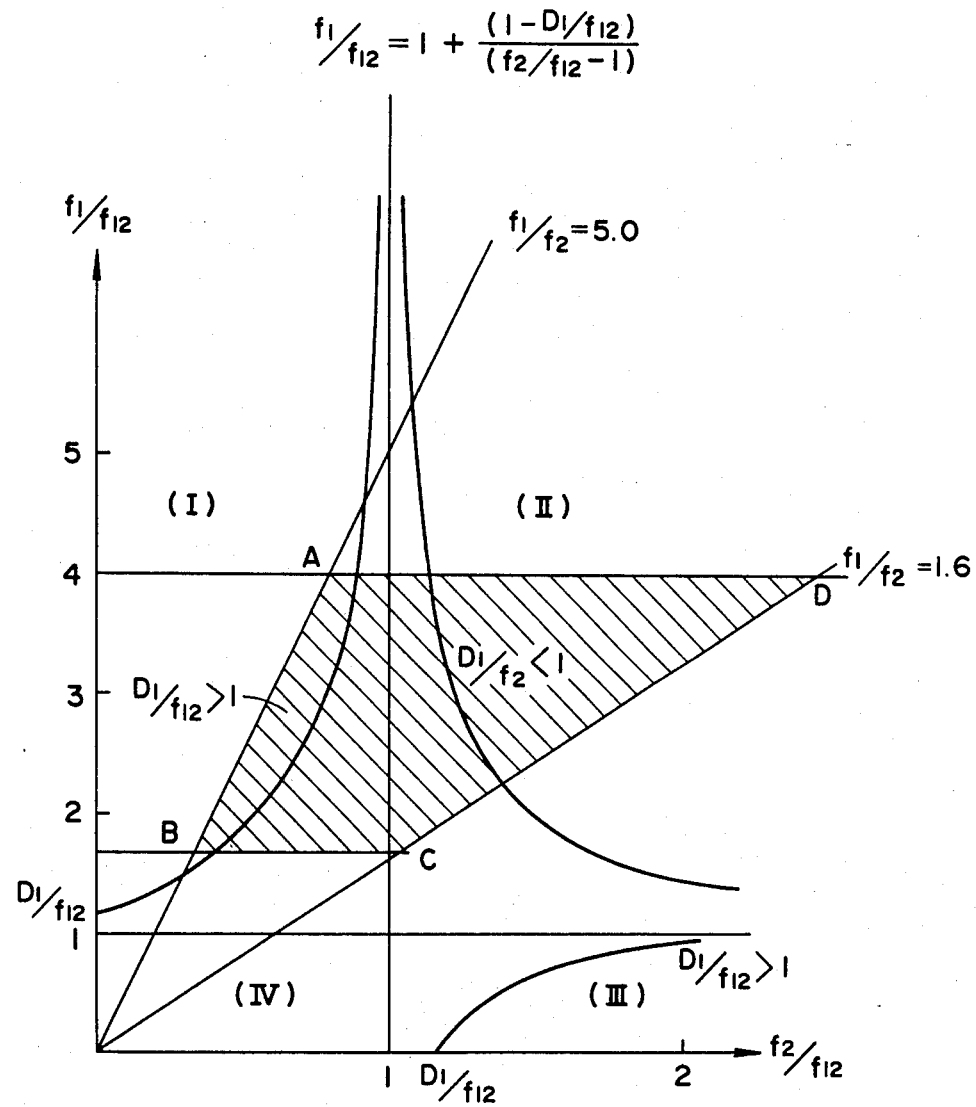
FIG. 13 illustrates the principle of the refractive power distribution in the construction of the present invention.

The graph of this is shown in FIG. 13 with $f_{12}>0$, $f_1>0$ and $f_2>0$ and with $f_{12}$ and $D_1$ being regarded as constant.

As will later be described, in the present invention, FIG. 13 illustrates desirable areas except the meaningless area in the range encompassed by ABCD. If the distance from the image point of the first and the second group, namely, the object point of the third group, to the image side principal point of the second group is $D_2$, $$D_2 = f_2(1 - f_{12}/f_1):$$

By this amount, it is possible to examine the variation in spacing of the second and third groups.

When $\dfrac{f_1}{f_{12}} = 1 (D_1/f_{12} = 1),$ the second group is positioned at the image point of the first group and the entire system does not resort to the refractive power of the second group and therefore, this is excluded, and when $f_2/f_{12}=1$, $f_1$ entirely loses the refractive power and this is not suited for the present invention.

Accordingly, in FIG. 13, the area which the construction of the present invention can assume is divided into the following four areas by the straight lines of $f_1/f_{12}=1$ and $f_2/f_{12}=1$:

| | | | |
|---|---|---|---|
| Area (I): | $f_1/f_{12} > 1$ | and | $0 < f_2/f_{12} < 1$ |
| Area (II): | $f_1/f_{12} > 1$ | and | $f_2/f_{12} > 1$ |
| Area (III): | $0 < f_1/f_{12} < 1$ | and | $f_2/f_{12} > 1$ |
| Area (IV): | $0 < f_1/f_{12} < 1$ | and | $0 < f_2/f_{12} < 1$ |

The area (IV) is a case where the refractive powers of the first and second groups are very strong, and is an area which cannot be realized. The area (III) is excluded because the refractive power of the first group is too strong and correction of aberrations is difficult and the advantage of the Petzval type cannot be utilized.

Accordingly, practically possible areas are the areas (I) and (II). The area (I) is one having such a refractive power distribution that the first and second groups afford chiefly brightness and do not so much provide photographing magnification and the third group affords a large magnification $\beta_3$ to enable high magnification proximity photography and the amount of axial movement to be reduced. The area (II) is one having a refractive power distribution suited for the first and second groups providing both brightness and photographing magnification. When the refractive power of the first group is made strong in order to increase the maximum photographing magnification in the combined system of the first and second groups, the refractive power of the second group becomes weak and does not sharply refract the short distance light beam which becomes a divergent light beam after having passed through the first group and, therefore, it advantageously tends to eliminate any fluctuation of aberrations.

Condition (5) is concerned with the refractive power distribution in the first group for a desirable combined refractive power of the first and second groups. If the lower limit of this condition is exceeded, the refractive power of the first group will become too strong and the occurrence of annular spherical aberration will be significant. As can be seen in FIG. 13, in the area (II) which exceeds the lower limit of this condition, even if the refractive power of the first group becomes strong, the refractive power of the second group does not become strong but conversely becomes weak. However, relatively too much load is exerted on the first group and the lens system cannot stand bright use, and this is not desirable.

In the area (I) which exceeds the lower limit of this condition, the spacing between the first and second group cannot sufficiently be secured. Also, the system comprising the first and second groups causes unreasonableness in the brightness with which the first group can be used, and correction of aberrations becomes difficult. This can readily be seen from the fact that the refractive power becomes strong in the area (I) of FIG. 13. If the upper limit of this condition is exceeded, an effort to shorten the near distance and greatly earn the maximum photographing magnification will lead to a result that the light beam leaving the object point on the optical axis becomes a divergent light beam at a low photographing magnification after having passed through the first group. Too much load of aberration correction is exerted on the second group and fluctuation of aberrations such as annular sherical aberration, etc. is undesirably created.

Also, in the area (I) which exceeds the upper limit of this condition, the total length of the optical system becomes great to hamper the compactness of the system.

Condition (6) prescribes the proper refractive power distribution in the second group with respect to the refractive power of the first group. Like condition (5), this is a condition for providing a good balance of aberration correction, and also a complementary condition for sufficiently securing the spacing between the first and the second group and the spacing between the second and the third group. If the upper limit of this condition is exceeded, it will be desirable only for the purpose of providing a large aperture ratio, as in the case of condition (5), but it will become difficult to obtain a large aperture ratio lens having a large photographing magnification and it will become impossible to sufficiently secure the spacing between the first and the second group, which is not desirable.

If the lower limit of this condition is exceeded, the refractive power of the first group will become too weak and even in infinity photography, correction of spherical aberration will become difficult and, in the area (II), it will be impossible to sufficiently secure the spacing between the second and the third group, which is undesirable. In the area (I) which exceeds the lower limit of this condition, it will become impossible to sufficiently secure the spacing between the first and the second group and the spacing between the second and the third group, and this is again undesirable.

Condition (7) is one that is desirable to maintain an aberration balance at infinity and short distance. The origin of the coordinates of the function is always the lens arrangement in the infinity photography condition. If the lower limit of this condition is exceeded, there will be no difference between the amounts of movement of the first and the second group and these groups may be regarded as integral and the lens system will to approximate to a forward group focusing system comprising two positive and negative lens groups. If the upper limit of this condition is exceeded, coma and astigmatism will be over-corrected and this is not desirable.

Since the present invention is directed to high magnification proximity photography, the distortion at near distance must be sufficiently corrected. Therefore, the following condition is further desired:

$$0.6 < q_1 < 1.3 \tag{9}$$

$q_1 = (r_2 + r_1)/(r_2 - r_1)$ is the shape factor of the first positive lens in the first group, and $r_1$ and $r_2$ are the radii of curvature of the surfaces thereof which are adjacent to the object side and the image side, respectively. If the lower limit of this condition is exceeded, distortion will become excessive in the positive direction and astigmatism will become excessive in the negative direction, and this is not desirable. If the upper limit of this condition is exceeded, astigmatism will become excessive in the positive direction, and this is undesirable.

Assuming that the Petzval sum of the entire optical system is P, it is desirable that P be in the following range:

$$0.0006 < P < 0.0018 \tag{10}$$

In this range, astigmatism and flatness of the image plane can be allowed. By adopting glasses of high refractive index for the first and second groups to provide a large aperture ratio and reduce the fluctuation of aberrations during short distance photography, the refractive power of the negative lens components is apt to be weak. Therefore, the Petzval sum is apt to be excessively positive, but the Petzval sum can be balanced to an appropriate value by the negative lens group of the third group.

In order to provide a large aperture ratio for a medium telephoto lens and reduce the amount of axial movement during the nearest distance photography, it is desirable that the magnification $\beta_3$ borne by the third group be in the range of $1.3 < \beta_3 < 1.7$. When the lens is made compact at the sacrifice of brightness and a reduction in amount of axial movement is desired, the range of $1.7 < \beta_3 < 2.2$ will be desirable in the high magnification proximity photography of a telephoto lens. On the other hand, if a large aperture ratio is desired and the amount of axial movement during focusing is made great to some degree and the Petzval sum is controlled to correct the flattening of the image plane, then the range of $1.1 < \beta_3 < 1.3$ will be desirable. In this case, however, it will be difficult to realize a compact telephoto lens.

In the above-described basic three-group construction of the present invention, it is desirable that the first group have, in succession from the object side, a positive lens component and a negative lens component, that the second group have a meniscus lens component having its convex surface facing the image side and a positive lens group and that the third group have at least one negative lens component. Further, it is desirable that the second positive lens component in the first group be a positive meniscus lens having its convex surface facing the object side and the negative lens component in the first group be a negative meniscus lens having its convex surface facing the object side. As regards the second group, one of the meniscus lens component and the positive lens component should desirably be a cemented component. The third group may basically comprise four components, namely, positive, negative, positive and negative components in succession from the object side, or may comprise three components, positive, negative and positive or may comprise only a single positive lens component. As a further alternative, the third group may comprise two groups each of which may in turn comprise a plurality of positive and negative lenses.

Figure 2A:
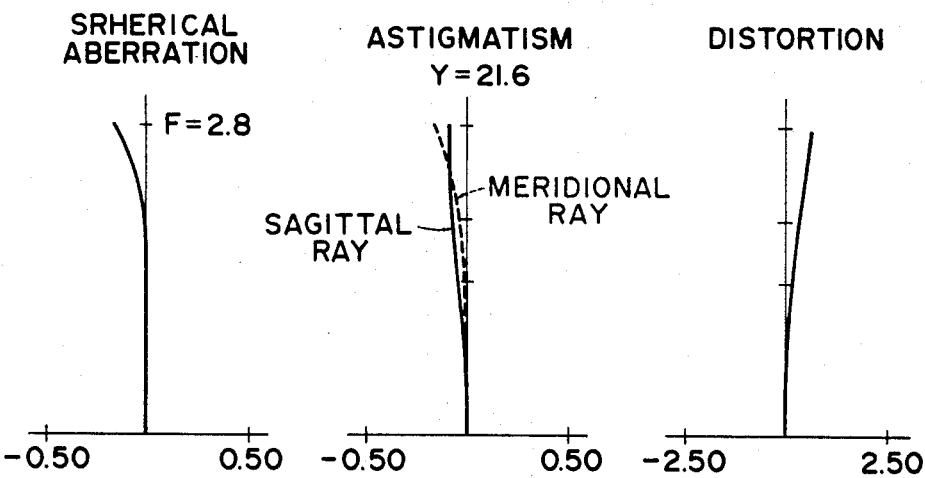
FIGS. 2A, 4A, 6A, 8A, 10A and 12A illustrate the aberrations of the respective embodiments in infinity photography condition.
Figure 2A:
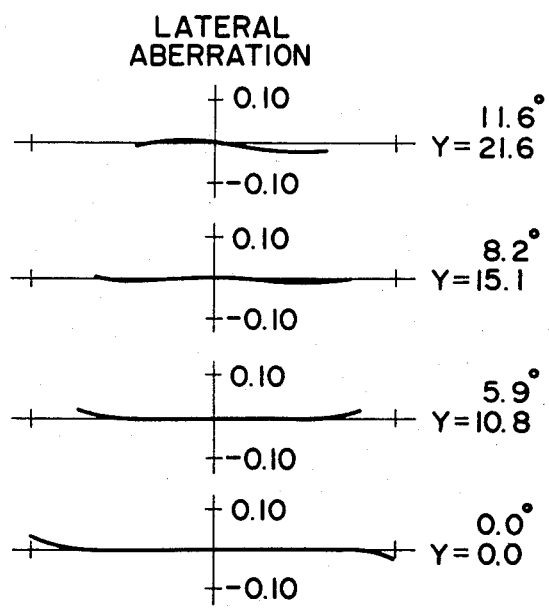
Figure 2B:
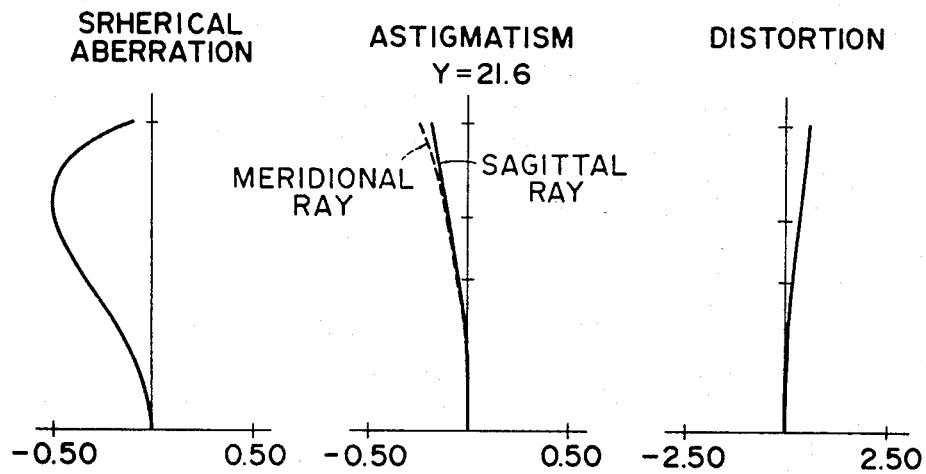
FIGS. 2B, 4B, 6B, 8B, 10B and 12B illustrate the aberrations of the respective embodiments in near distance photography condition.
Figure 2B:
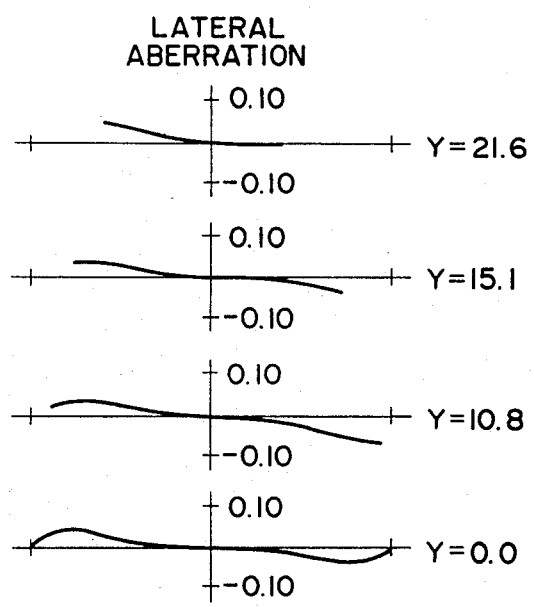

Embodiments of the present invention will hereinafter be described. All the embodiments are for 35 mm cameras. The diaphragm is movable always with the second group to effect focusing. At this time, $\Delta y/\Delta x$ is the average variation rate of the amount of variation in the spacing between the first and the second group to the amount of variation in the spacing between the second and the third group. The basic embodiment of the present invention is a first embodiment. The focal length $f=105$, F-number $F=2.8$ and the angle of view $2\omega=23.25°$, and FIG. 1 shows the arrangement of the first embodiment during infinity photography. The numerical data of the first embodiment is shown in Table 1 and the aberrations thereof are illustrated in FIG. 2. FIGS. 2A and 2B illustrates the aberrations during infinity photography, and FIG. 2B illustrates the aberrations when the object distance $d_0=254.9907$ and the photographing magnification $\beta=-0.5$. The average variation rate of the group movements by focusing is $\Delta y/\Delta x=0.25515$ and as shown, the various aberrations are corrected very well. In the present embodiment, the amount of axial movement is 0.627 times as great as that in the whole axial movement system.

Figure 3:
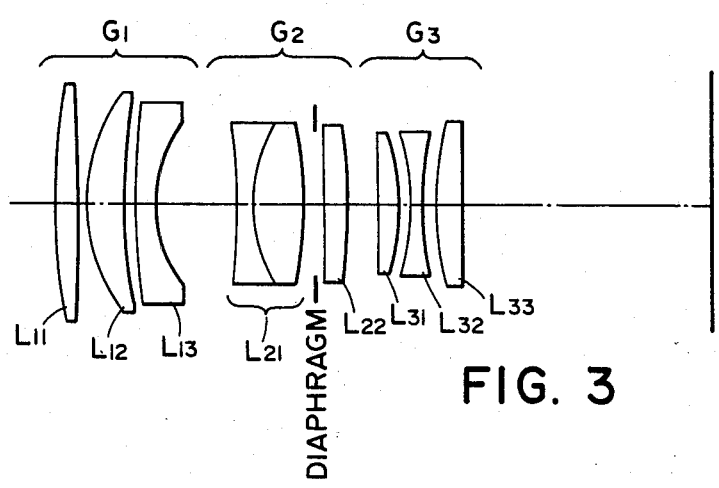
Figure 4A:
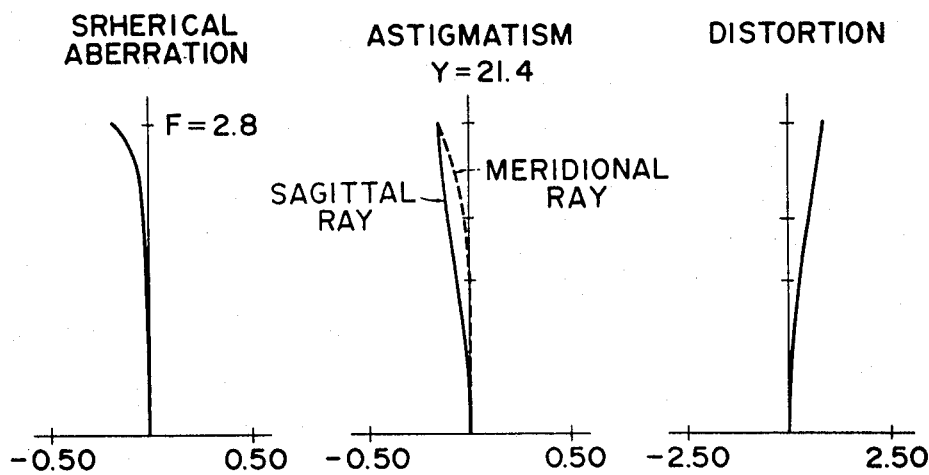
Figure 4A:
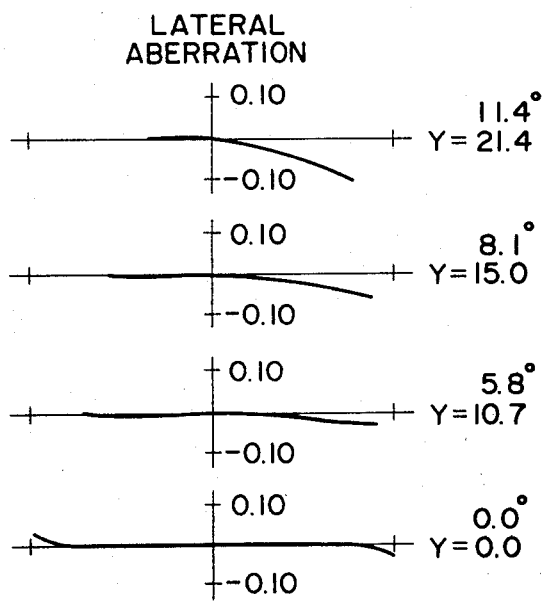
Figure 4B:
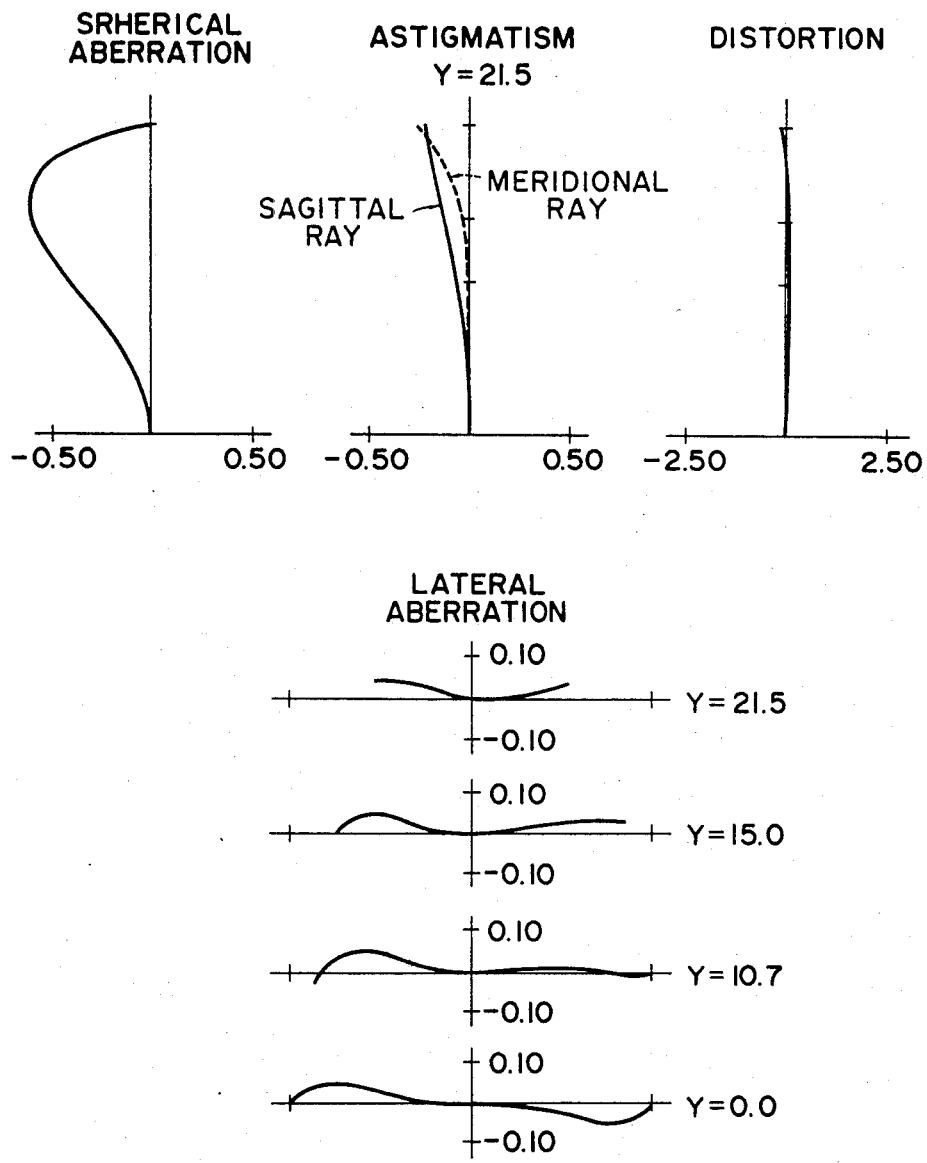

A second embodiment is one in which the last negative lens in the third group of the first embodiment has been eliminated. The focal length $f=105.187$, F-number $F=2.8$ and the angle of view $2\omega=23.21°$, and FIG. 3 shows the arrangement of the second embodiment during infinity photography. The numerical data of the second embodiment are shown in Table 2. The aberrations of the second embodiment are illustrated in FIG. 4. FIGS. 4A and 4B illustrates the aberrations during infinity photography, and FIG. 4B illustrates the aberrations when the object distance $d_0=265.1865$ and the photographing magnification $\beta=-0.5$. The average variation rate of the group movements by focusing is $\Delta y/\Delta x=0.25515$. The second embodiment comprises very simple lens groups and is compact. The amount of axial movement in the second embodiment is the same as that in the first embodiment.

Figure 5:
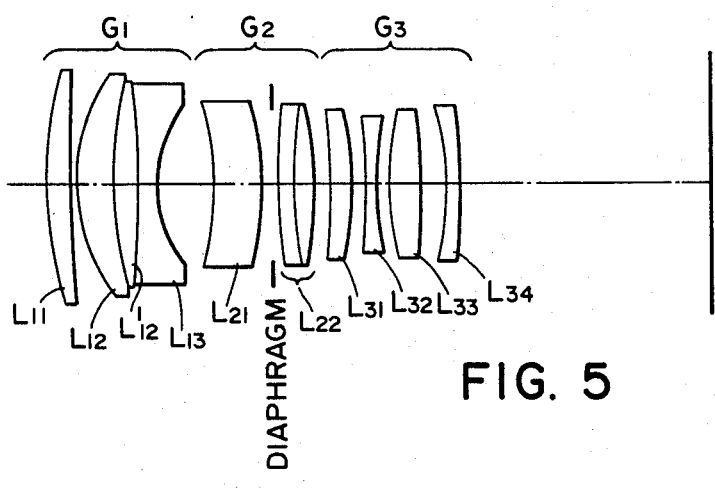
Figure 6A:
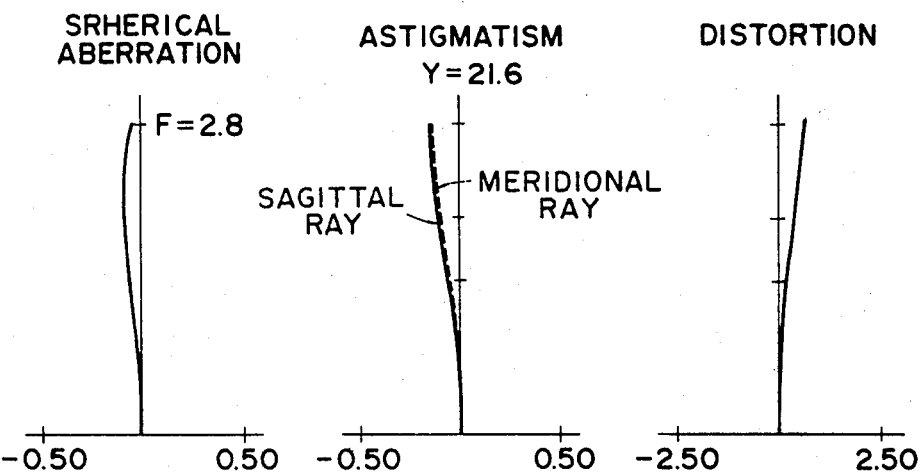
Figure 6A:
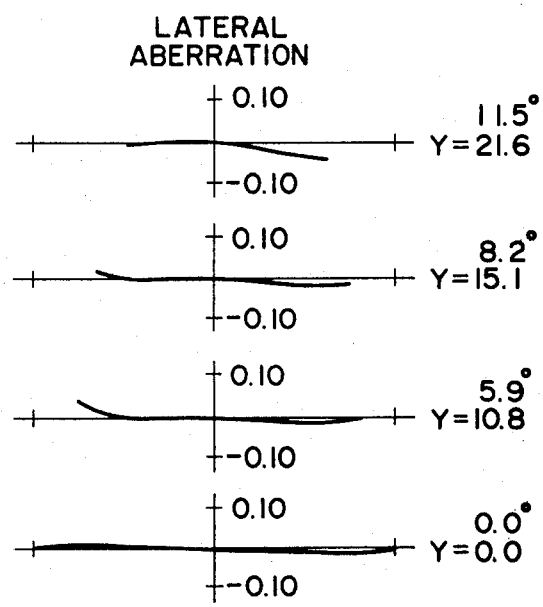
Figure 6B:
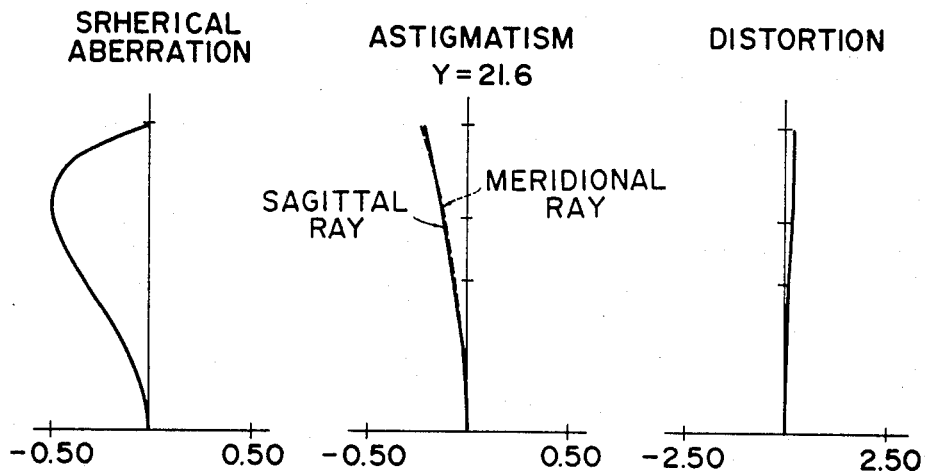
Figure 6B:
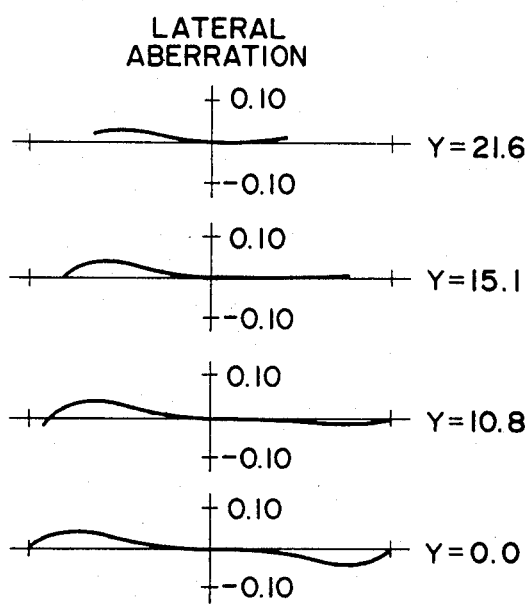

A third embodiment is one in which, as compared with the first embodiment, a triplet lens is introduced into the first group; and as regards the second group, the position of the cemented surface is provided in the positive lens. The focal length $f=105.187$, F-number $F=2.8$ and the angle of view $2\omega=23.21°$, and FIG. 5 shows the arrangement of the third embodiment during infinity photography. The numerical data of the third embodiment are shown in Table 3. The aberrations of the third embodiment are illustrated in FIGS. 6A and 6B. FIG. 6A illustrates the aberrations during infinity photography, and FIG. 6B illustrates the aberrations when the object distance $d_0=268.6618$ and the photographing magnification $\beta=-0.5$. The average variation rate of the group movements during focusing is $\Delta y/\Delta x=0.25515$. The amount of axial movement in the third embodiment is the same as that in the first embodiment.

Figure 7:
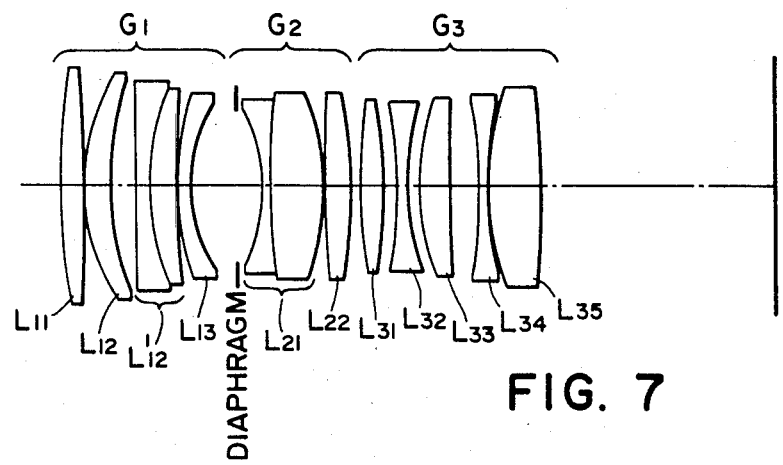
Figure 8A:
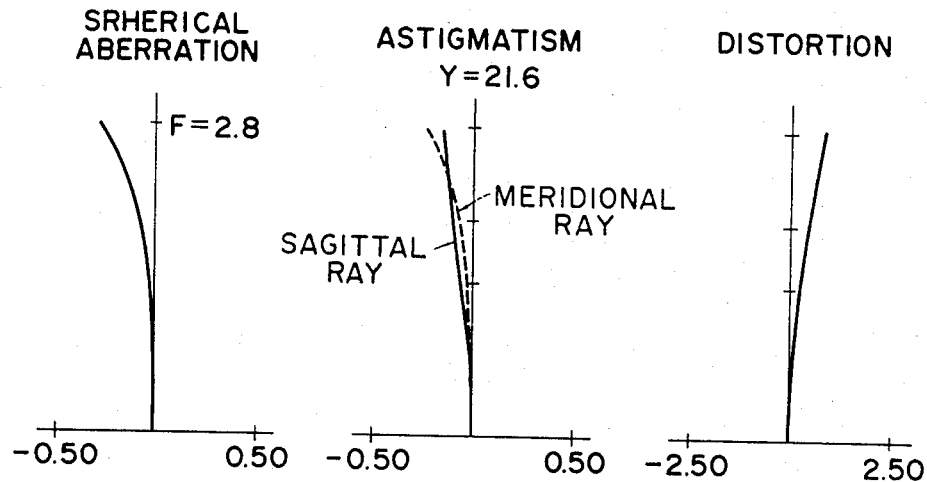
Figure 8A:
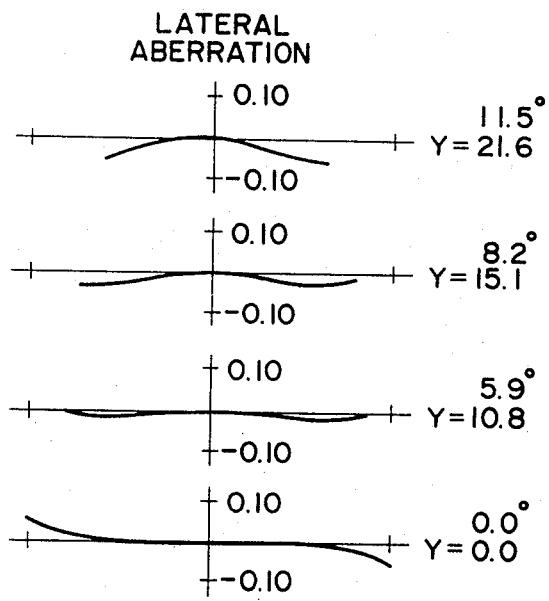
Figure 8B:
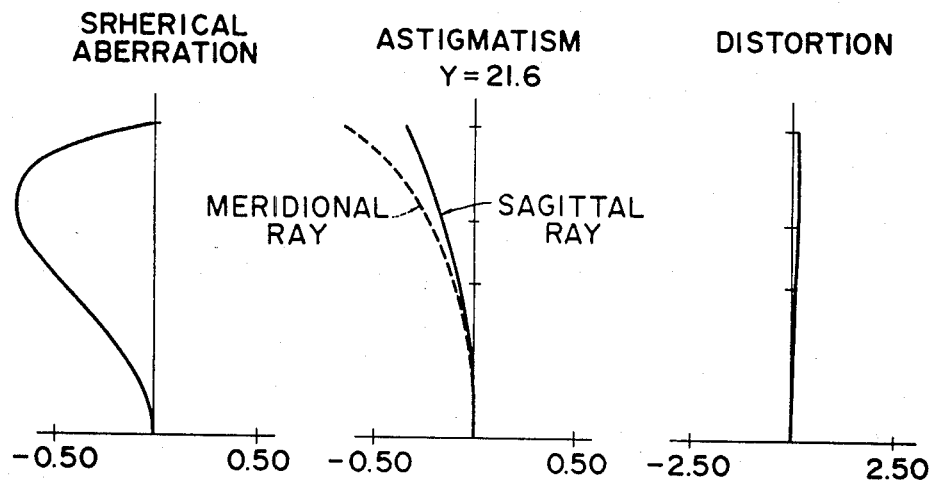
Figure 8B:
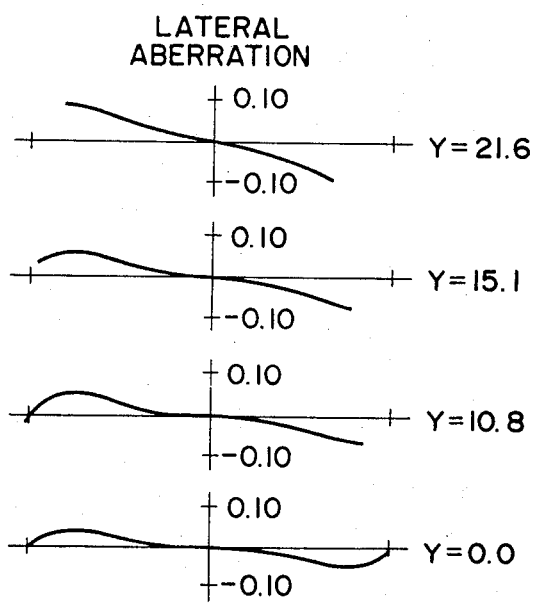

In a fourth embodiment, the focal length $f=105.0$, F-number $F=2.8$ and the angle of view $2\omega=23.25°$. FIG. 7 shows the arrangement of the fourth embodiment during infinity photography, and the numerical data thereof are shown in Table 4. The aberrations of the fourth embodiment are illustrated in FIGS. 8A and 8B. FIG. 8A illustrates the aberrations during infinity photography, and FIG. 8B illustrates the aberrations when the object distance $d_0=149.1795$ and the photographing magnification $\beta=-1.0$. The average variation rate of the group movements during focusing is $\Delta y/\Delta x=0.255515$. This embodiment is a lens system which does not sacrifice brightness and enables high magnification proximity photography as much as possible. Therefore, the lens construction of each group is more complicated. In such a telephoto lens system, when photography is effected at $\beta=-1.0$ by the whole axial movement system, the amount of axial movement becomes f and great and this is mechanically undesirable. In the present invention, photography can be accomplished at the same magnification by axial movement of the order of 0.6559f and therefore, the lens system becomes compact for short distance, and this is very desirable.

Figure 9:
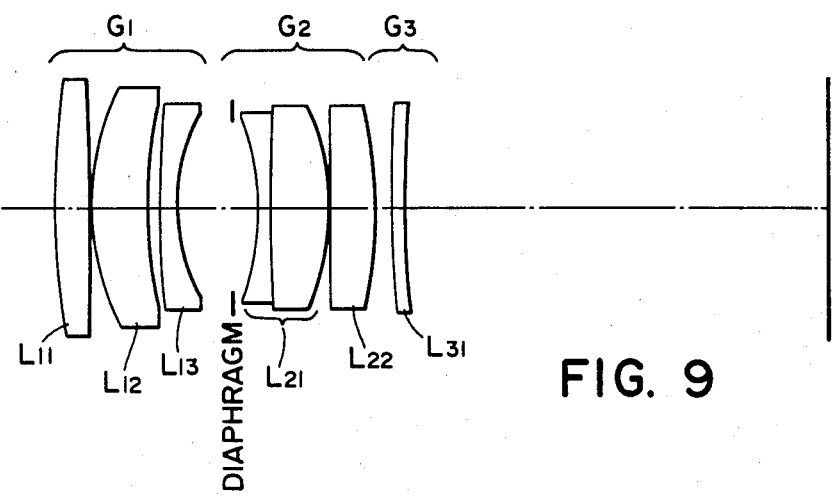
Figure 10A:
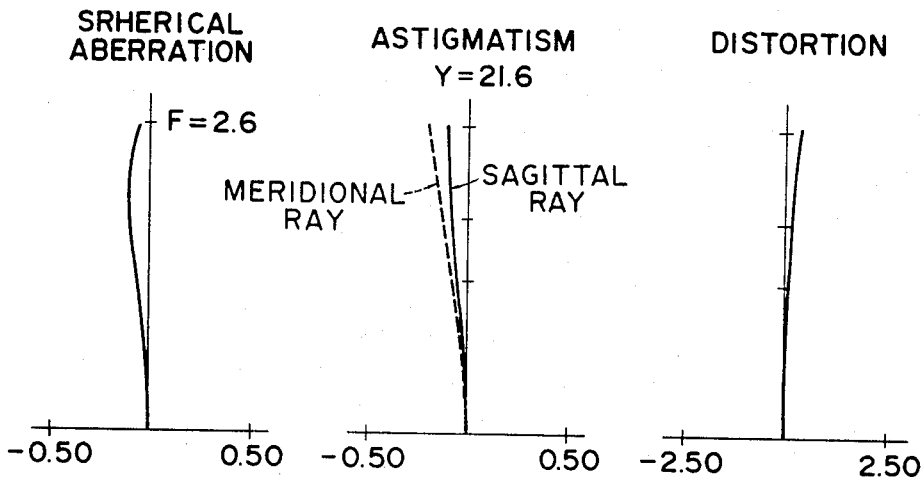
Figure 10A:
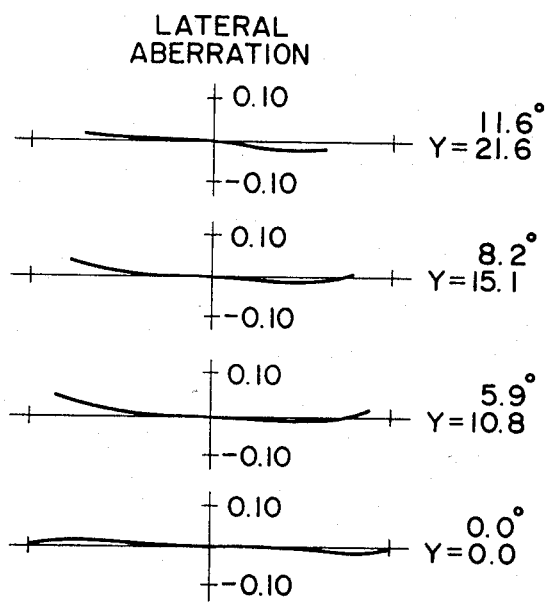
Figure 10B:
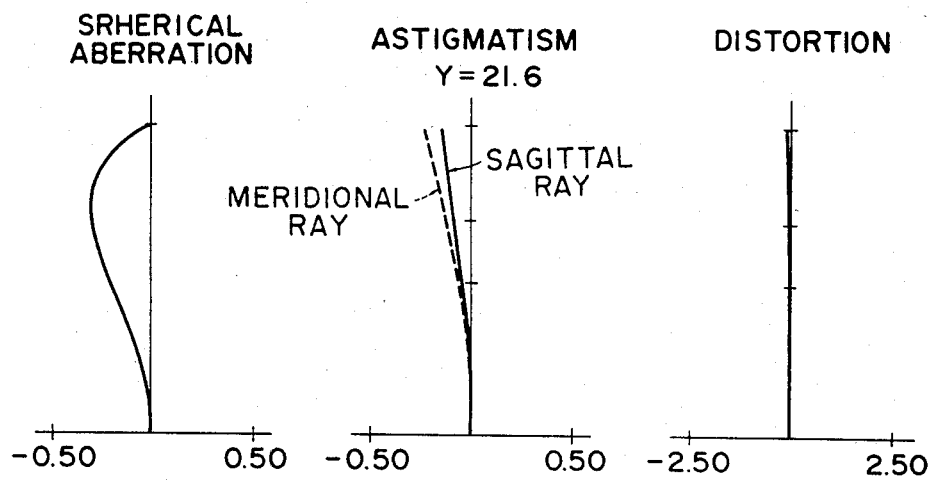
Figure 10B:
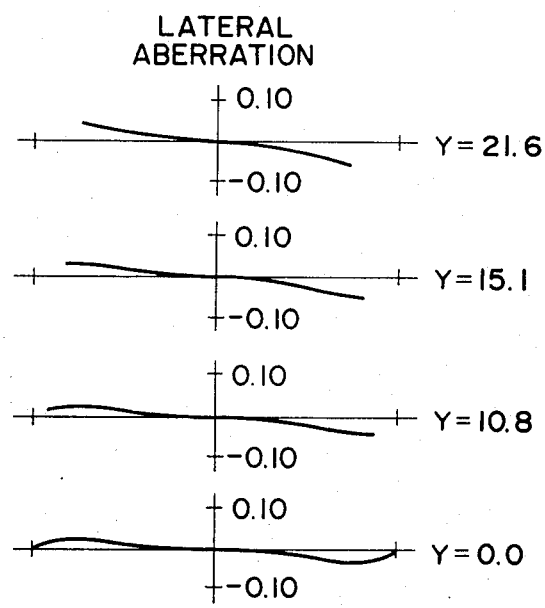

In a fifth embodiment, the focal length $f=105.0$, F-number $F=2.6$ and the angle of view $2\omega=23.25°$. FIG. 9 shows the arrangement of the fifth embodiment in an infinity photography condition. The numerical data of the fifth embodiment are shown in Table 5. The aberrations of the fifth embodiment are illustrated in FIGS. 10A and 10B. FIG. 10A illustrates the aberrations during infinity photography, and FIG. 10B illustrates the aberrations when the object distance $d_0=261.4080$ and the photographing magnification $\beta=-0.525$. The average variation rate of the group movements during focusing is $\Delta y/\Delta x=0.33489$. This embodiment is made as bright as possible and each group thereof is of a simple lens construction. From this fact, it may be said that the focusing system like the present invention is a system desirable to shorten the nearest distance as much as possible while providing a large aperture ratio, to thereby maintain a high performance.

Figure 11:
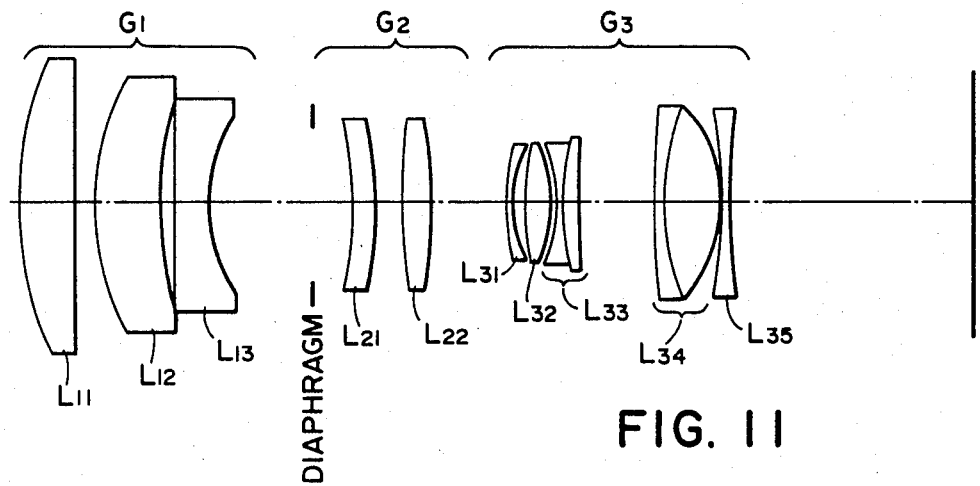
Figure 12A:
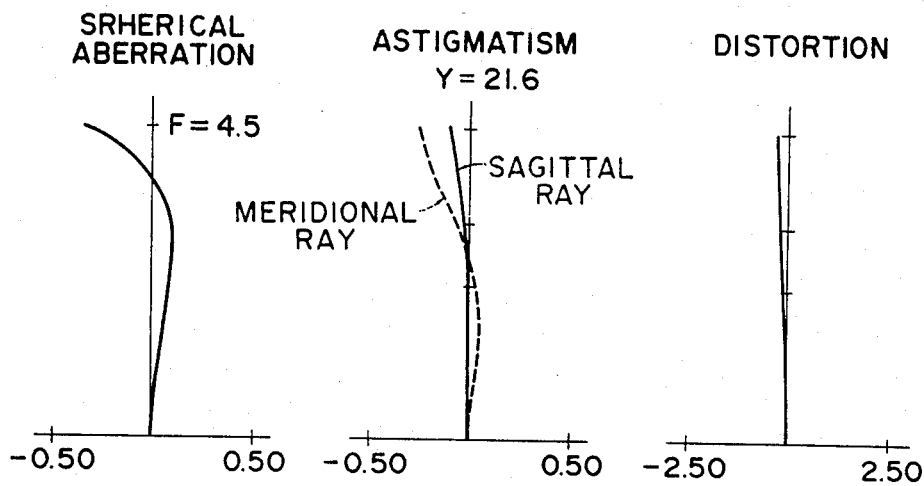
Figure 12A:
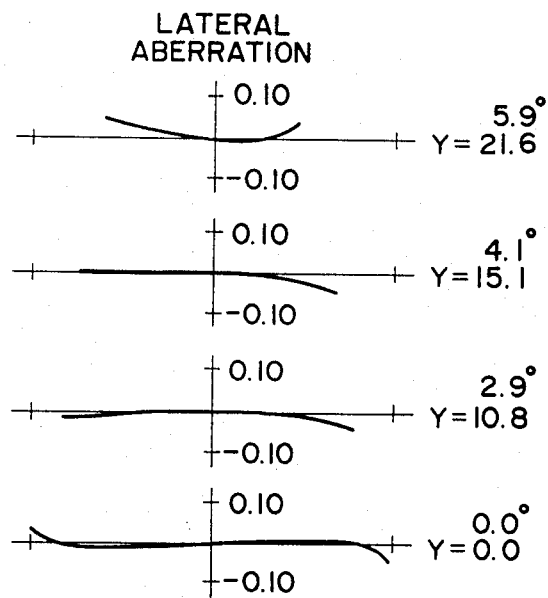
Figure 12B:
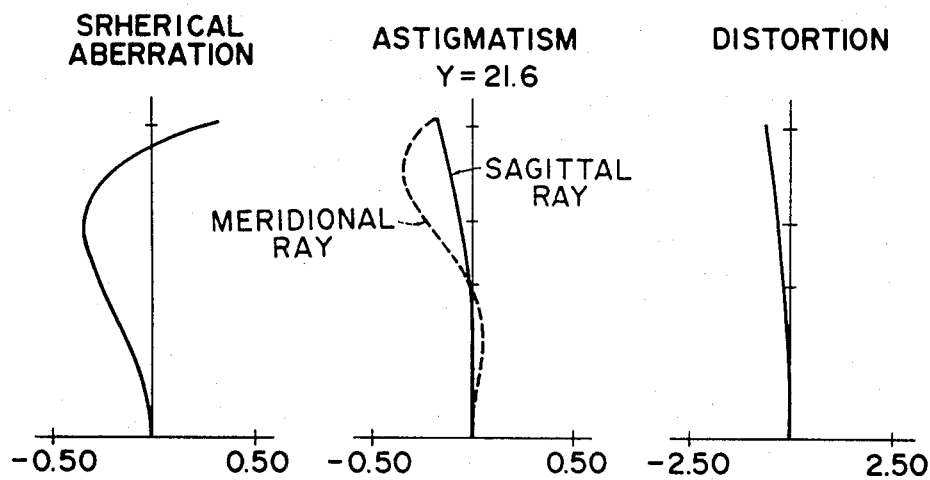
Figure 12B:
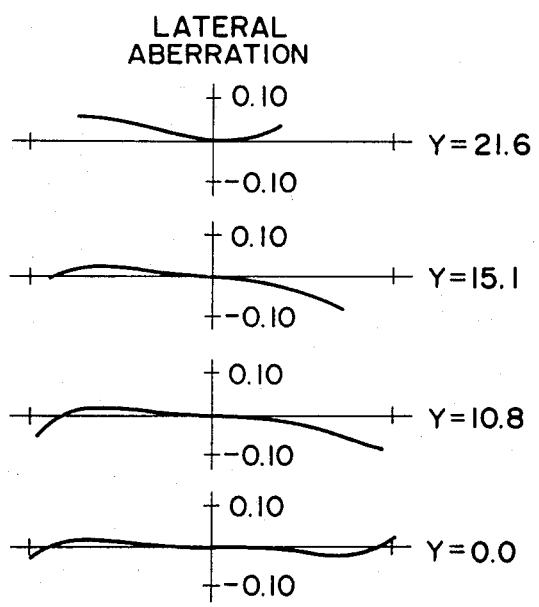

In a sixth embodiment, the focal length $f=210.0$, F-number $F=4.5$ and the angle of view $2\omega=11.75°$. FIG. 11 shows the arrangement of this embodiment in an infinity photography condition. The numerical data of the sixth embodiment are shown in Table 6. The aberrations of the sixth embodiment are illustrated in FIGS. 12A and 12B. FIG. 12A illustrates the aberrations during infinity photography, and FIG. 12B illustrates the aberrations when the object distance $d_0=479.6208$ and the photographing magnification $\beta=-0.5$. The average variation rate of the group movements during focusing is $\Delta y/\Delta x=0.30629$. In this embodiment, the telephoto ratio is made as small as possible for the purpose of providing a telephoto lens and therefore, brightness is sacrificed. As a result, the amount of axial movement by focusing can be realized at about 0.314 times as great as that in the whole axial movement system. Any of these embodiments is an optical system which could be realized only by providing a large aperture ratio for the lens systems of the first and second groups and by introducing an optical system whose short distance photographing performance is hardly deteriorated.

In the Tables, $r_1, r_2, r_3, \ldots$ represent the radii of curvature of the successive lens surfaces from the object side, $d_1, d_2, d_3, \ldots$ represent the center thicknesses and air spaces of the respective lenses, and $n_1, n_2, \ldots$ and $\nu_1, \nu_2, \ldots$ represent the refractive indices and Abbe numbers, respectively, of the respective lenses.

TABLE 1

(First Embodiment)

Focal length $f = 105$  F-number $F = 2.8$
Angle of view $2\omega = 23.25°$  $d_0 = \infty \sim 254.9907$

| Group | r | d | n | ν | Lens |
|---|---|---|---|---|---|
| First Group $G_1$ | $r_1 = 74.500$ | $d_1 = 5.0$ | $n_1 = 1.77279$ | $\nu_1 = 49.4$ | $L_{11}$ |
| | $r_2 = -1042.700$ | $d_2 = 0.15$ | | | |
| | $r_3 = 29.000$ | $d_3 = 5.0$ | $n_2 = 1.71700$ | $\nu_2 = 48.1$ | $L_{12}$ |
| | $r_4 = 57.000$ | $d_4 = 2.0$ | | | |
| | $r_5 = 91.280$ | $d_5 = 2.0$ | $n_3 = 1.74950$ | $\nu_3 = 35.2$ | $L_{13}$ |
| | $r_6 = 24.131$ | $d_6 = 13.9866 \sim 20.6820$ | | | |
| Second Group $G_2$ | $r_7 = -31.190$ | $d_7 = 2.0$ | $n_4 = 1.68893$ | $\nu_4 = 31.1$ | $L_{21}$ |
| | $r_8 = 300.000$ | $d_8 = 10.5$ | $n_5 = 1.73350$ | $\nu_5 = 51.1$ | |
| | $r_9 = -41.983$ | $d_9 = 3.0$ | | | |
| | $r_{10} = 310.300$ | $d_{10} = 5.0$ | $n_6 = 1.69350$ | $\nu_6 = 53.8$ | $L_{22}$ |
| | $r_{11} = -70.248$ | $d_{11} = 8.1258 \sim 34.3666$ | | | |
| Third Group $G_3$ | $r_{12} = -191.637$ | $d_{12} = 4.0$ | $n_7 = 1.59507$ | $\nu_7 = 35.5$ | $L_{31}$ |
| | $r_{13} = -55.637$ | $d_{13} = 2.0$ | | | |
| | $r_{14} = -114.216$ | $d_{14} = 1.8$ | $n_8 = 1.79668$ | $\nu_8 = 45.5$ | $L_{32}$ |
| | $r_{15} = 50.880$ | $d_{15} = 1.8$ | | | |
| | $r_{16} = 45.690$ | $d_{16} = 6.0$ | $n_9 = 1.59507$ | $\nu_9 = 35.5$ | $L_{33}$ |
| | $r_{17} = -175.850$ | $d_{17} = 4.6$ | | | |
| | $r_{18} = -38.545$ | $d_{18} = 2.0$ | $n_{10} = 1.80454$ | $\nu_{10} = 39.6$ | $L_{34}$ |
| | $r_{19} = -77.213$ | | | | |

$f_1 = 153.000$  $f_{12} = 75.0$  $\Delta y/\Delta x = 0.25515$
$f_2 = 80.769$  $q_1 = 0.867$  $P = 0.00114$
$f_3 = -118.525$  The diaphragm lies 1.5mm ahead of the fifth lens $L_{22}$.

TABLE 2

(Second Embodiment)

Focal length $f = 105.187$  F-number $F = 2.8$
Angle of view $2\omega = 23.21°$  $d_0 = \infty \sim 265.1865$

| Group | r | d | n | ν | Lens |
|---|---|---|---|---|---|
| First Group $G_1$ | $r_1 = 107.669$ | $d_1 = 4.15$ | $n_1 = 1.76684$ | $\nu_1 = 46.8$ | $L_{11}$ |
| | $r_2 = -533.176$ | $d_2 = 0.7$ | | | |
| | $r_3 = 29.357$ | $d_3 = 6.7$ | $n_2 = 1.79668$ | $\nu_2 = 45.5$ | $L_{12}$ |
| | $r_4 = 84.686$ | $d_4 = 2.05$ | | | |
| | $r_5 = 204.175$ | $d_5 = 3.3$ | $n_3 = 1.75520$ | $\nu_3 = 27.6$ | $L_{13}$ |
| | $r_6 = 23.623$ | $d_6 = 14.4023 \sim 21.0977$ | | | |
| Second Group $G_2$ | $r_7 = -82.105$ | $d_7 = 2.3$ | $n_4 = 1.75520$ | $\nu_4 = 27.6$ | $L_{21}$ |
| | $r_8 = 26.484$ | $d_8 = 9.1$ | $n_5 = 1.76684$ | $\nu_5 = 46.8$ | |
| | $r_9 = -64.715$ | $d_9 = 3.0$ | | | |
| | $r_{10} = -7971.249$ | $d_{10} = 4.3$ | $n_6 = 1.71300$ | $\nu_6 = 54$ | $L_{22}$ |
| | $r_{11} = -84.941$ | $d_{11} = 4.8129 \sim 31.0537$ | | | |
| Third Group $G_3$ | $r_{12} = -822.692$ | $d_{12} = 4.0$ | $n_7 = 1.59507$ | $\nu_7 = 35.5$ | $L_{31}$ |
| | $r_{13} = -35.108$ | $d_{13} = 2.0$ | | | |
| | $r_{14} = -32.776$ | $d_{14} = 1.8$ | $n_8 = 1.79668$ | $\nu_8 = 45.5$ | $L_{32}$ |
| | $r_{15} = 51.278$ | $d_{15} = 1.8$ | | | |
| | $r_{16} = 43.213$ | $d_{16} = 5.0$ | $n_9 = 1.59507$ | $\nu_9 = 35.5$ | $L_{33}$ |
| | $r_{17} = 168888.708$ | | | | |

$f_1 = 153.00$  $f_{12} = 75.0$  $\Delta y/\Delta x = 0.25515$
$f_2 = 80.769$  $q_1 = 0.664$  $P = 0.00169$
$f_3 = -118.00$  The diaphragm lies 1.5mm ahead of the fifth lens $L_{22}$.

TABLE 3

(Third Embodiment)

Focal length $f = 105.187$  F-number $F = 2.8$
$d_0 = \infty \sim 268.6618$  Angle of view $2\omega = 23.21°$

| Group | r | d | n | ν | Lens |
|---|---|---|---|---|---|
| First Group $G_1$ | $r_1 = 78.231$ | $d_1 = 4.15$ | $n_1 = 1.76684$ | $\nu_1 = 46.8$ | $L_{11}$ |
| | $r_2 = 663.375$ | $d_2 = 0.7$ | | | |
| | $r_3 = 31.990$ | $d_3 = 6.7$ | $n_2 = 1.76684$ | $\nu_2 = 46.8$ | $L_{12}$ |
| | $r_4 = 79.989$ | $d_4 = 4.0$ | $n_3 = 1.58267$ | $\nu_3 = 46.5$ | $L_{12}$ |
| | $r_5 = -177.053$ | $d_5 = 3.3$ | $n_4 = 1.75520$ | $\nu_4 = 27.6$ | $L_{13}$ |
| | $r_6 = 23.920$ | $d_6 = 9.8444 \sim 16.5398$ | | | |
| Second Group $G_2$ | $r_7 = -43.896$ | $d_7 = 8.0$ | $n_5 = 1.67003$ | $\nu_5 = 47.1$ | $L_{21}$ |
| | $r_8 = -58.056$ | $d_8 = 3.0$ | | | |
| | $r_9 = 309.188$ | $d_9 = 2.0$ | $n_6 = 1.71736$ | $\nu_6 = 29.5$ | $L_{22}$ |
| | $r_{10} = 63.787$ | $d_{10} = 4.0$ | $n_7 = 1.73350$ | $\nu_7 = 51.1$ | |
| | $r_{11} = -63.636$ | $d_{11} = 2.5291 \sim 28.7699$ | | | |

TABLE 3-continued

(Third Embodiment)

Focal length f = 105.187 F-number F = 2.8
$d_0 = \infty \sim 268.6618$ Angle of view $2\omega = 23.21°$

| | | | | | |
|---|---|---|---|---|---|
| Third Group $G_3$ | $r_{12} = -111.194$ | $d_{12} = 4.0$ | $n_8 = 1.66755$ | $\nu_8 = 42.0$ | $L_{31}$ |
| | $r_{13} = -53.353$ | $d_{13} = 2.0$ | | | |
| | $r_{14} = -113.983$ | $d_{14} = 1.8$ | $n_9 = 1.80218$ | $\nu_9 = 44.7$ | $L_{32}$ |
| | $r_{15} = 45.948$ | $d_{15} = 1.8$ | | | |
| | $r_{16} = 41.777$ | $d_{16} = 6.0$ | $n_{10} = 1.66446$ | $\nu_{10} = 35.9$ | $L_{33}$ |
| | $r_{17} = -130.887$ | $d_{17} = 4.6$ | | | |
| | $r_{18} = -40.915$ | $d_{18} = 2.0$ | $n_{11} = 1.79631$ | $\nu_{11} = 41$ | $L_{34}$ |
| | $r_{19} = -109.967$ | | | | |

$f_1 = 153.0$    $f_{12} = 75.0$    $\Delta y/\Delta x = 0.25515$
$f_2 = 80.769$    $q_1 = 1.267$    $P = 0.00127$
$f_3 = -118.00$    The diaphragm lies 1.5mm ahead of the sixth lens $L_{22}$.

TABLE 4

(Fourth Embodiment)

Focal length f = 105.0 F-number F = 2.8
$d_0 = \infty \sim 149.1795$ Angle of view $2\omega = 23.25°$

| | | | | | |
|---|---|---|---|---|---|
| First Group $G_1$ | $r_1 = 99.370$ | $d_1 = 4.5$ | $n_1 = 1.77279$ | $\nu_1 = 49.4$ | $L_{11}$ |
| | $r_2 = -682.579$ | $d_2 = 0.1$ | | | |
| | $r_3 = 37.643$ | $d_3 = 4.5$ | $n_2 = 1.77279$ | $\nu_2 = 49.4$ | $L_{12}$ |
| | $r_4 = 60.158$ | $d_4 = 4.0$ | | | |
| | $r_5 = -2018.698$ | $d_5 = 2.0$ | $n_3 = 1.69895$ | $\nu_3 = 80.1$ | $L'_{12}$ |
| | $r_6 = 39.556$ | $d_6 = 5.0$ | $n_4 = 1.79631$ | $\nu_4 = 39.6$ | |
| | $r_7 = 159.067$ | $d_7 = 0.1$ | | | |
| | $r_8 = 51.905$ | $d_8 = 2.0$ | $n_5 = 1.59507$ | $\nu_5 = 35.5$ | $L_{13}$ |
| | $r_9 = 24.944$ | $d_9 = 12.347 \sim 26.347$ | | | |
| Second Group $G_2$ | $r_{10} = -30.955$ | $d_{10} = 1.5$ | $n_6 = 1.64831$ | $\nu_6 = 33.8$ | $L_{21}$ |
| | $r_{11} = 251.790$ | $d_{11} = 9.1$ | $n_7 = 1.80411$ | $\nu_7 = 46.4$ | |
| | $r_{12} = -39.137$ | $d_{12} = 0.1$ | | | |
| | $r_{13} = 5315.299$ | $d_{13} = 4.3$ | $n_8 = 1.80411$ | $\nu_8 = 46.4$ | $L_{22}$ |
| | $r_{14} = -94.504$ | $d_{14} = 1.4438 \sim 56.3132$ | | | |
| Third Group $G_3$ | $r_{15} = 121.0$ | $d_{15} = 4.0$ | $n_9 = 1.59507$ | $\nu_9 = 35.5$ | $L_{31}$ |
| | $r_{16} = -100.350$ | $d_{16} = 2.0$ | | | |
| | $r_{17} = -118.300$ | $d_{17} = 1.8$ | $n_{10} = 1.79668$ | $\nu_{10} = 45.5$ | $L_{32}$ |
| | $r_{18} = 35.5$ | $d_{18} = 1.8$ | | | |
| | $r_{19} = 36.77$ | $d_{19} = 6.0$ | $n_{11} = 1.59507$ | $\nu_{11} = 35.5$ | $L_{33}$ |
| | $r_{20} = -5164.00$ | $d_{20} = 4.6$ | | | |
| | $r_{21} = -100.00$ | $d_{21} = 1.5$ | $n_{12} = 1.79668$ | $\nu_{12} = 45.5$ | $L_{34}$ |
| | $r_{22} = 70.000$ | $d_{22} = 0.2$ | | | |
| | $r_{23} = 54.000$ | $d_{23} = 9$ | $n_{13} = 1.51009$ | $\nu_{13} = 63.4$ | $L_{35}$ |
| | $r_{24} = -179.445$ | | | | |

$f_1 = 153.0$    $f_{12} = 75.0$    $\Delta y/\Delta x = 0.25515$
$f_2 = 80.769$    $q_1 = 0.746$    $P = 0.00125$
$f_3 = -125.525$    The diaphragm lies 4mm ahead of the fifth lens $L_{21}$.

TABLE 5

(Fifth Embodiment)

Focal length f = 105.0 F-number F = 2.6
Angle of view $2\omega = 23.25°$ $d_0 = \infty \sim 261.4080$

| | | | | | |
|---|---|---|---|---|---|
| First Group $G_1$ | $r_1 = 122.568$ | $d_1 = 6.08$ | $n_1 = 1.77279$ | $\nu_1 = 49.4$ | $L_{11}$ |
| | $r_2 = -2677.350$ | $d_2 = 0.19$ | | | |
| | $r_3 = 40.437$ | $d_3 = 10.118$ | $n_2 = 1.84042$ | $\nu_2 = 43.3$ | $L_{12}$ |
| | $r_4 = 93.003$ | $d_4 = 1.9$ | | | |
| | $r_5 = 194.456$ | $d_5 = 2.850$ | $n_3 = 1.75692$ | $\nu_3 = 31.7$ | $L_{13}$ |
| | $r_6 = 31.060$ | $d_6 = 14.501 \sim 29.796$ | | | |
| | $r_7 = -35.650$ | $d_7 = 1.853$ | $n_4 = 1.71736$ | $\nu_4 = 29.5$ | $L_{21}$ |
| Second Group $G_2$ | $r_8 = \infty$ | $d_8 = 9.738$ | $n_5 = 1.78797$ | $\nu_5 = 47.5$ | |
| | $r_9 = -43.010$ | $d_9 = 0.19$ | | | |
| | $r_{10} = 1009.388$ | $d_{10} = 7.790$ | $n_6 = 1.84042$ | $\nu_6 = 43.3$ | $L_{22}$ |
| | $r_{11} = -105.762$ | $d_{11} = 3.043 \sim 48.715$ | | | |
| Third Group $G_3$ | $r_{12} = 244.557$ | $d_{12} = 2.0$ | $n_7 = 1.46450$ | $\nu_7 = 65.8$ | $L_{31}$ |
| | $r_{13} = 137.036$ | | | | |

$f_1 = 246.031$    $f_{12} = 95.0$    $\Delta y/\Delta x = 0.33489$
$f_2 = 95.399$    $q_1 = 0.912$    $P = 0.00073$
$f_3 = -675.00$    The diaphragm lies 4.75mm ahead of the fourth lens $L_{21}$.

TABLE 6

(Sixth Embodiment)

Focal length f = 210.0 F-number F = 4.5
Angle of view 2ω = 11.75° $d_0 = \infty \sim 479.6208$

| | | | | | |
|---|---|---|---|---|---|
| First Group $G_1$ | $r_1 = 56.301$ | $d_1 = 9.5$ | $n_1 = 1.69680$ | $\nu_1 = 55.6$ | $L_{11}$ |
| | $r_2 = 9668.693$ | $d_2 = 3.1$ | | | |
| | $r_3 = 42.374$ | $d_3 = 11.5$ | $n_2 = 1.62041$ | $\nu_2 = 60.3$ | $L_{12}$ |
| | $r_4 = 68.455$ | $d_4 = 2.5$ | | | |
| | $r_5 = 3944.716$ | $d_5 = 5.6$ | $n_3 = 1.72825$ | $\nu_3 = 28.3$ | $L_{13}$ |
| | $r_6 = 28.393$ | $d_6 = 25.716 \sim 33.716$ | | | |
| Second Group $G_2$ | $r_7 = -41.143$ | $d_7 = 3.9$ | $n_4 = 1.59551$ | $\nu_4 = 39.2$ | $L_{21}$ |
| | $r_8 = -48.910$ | $d_8 = 4.1$ | | | |
| | $r_9 = 165.842$ | $d_9 = 5.0$ | $n_5 = 1.73350$ | $\nu_5 = 51.1$ | $L_{22}$ |
| | $r_{10} = -76.597$ | $d_{10} = 13.830 \sim 39.948$ | | | |
| Third Group $G_3$ | $r_{11} = 35.545$ | $d_{11} = 1.0$ | $n_6 = 1.79668$ | $\nu_6 = 45.5$ | $L_{31}$ |
| | $r_{12} = 17.780$ | $d_{12} = 1.8$ | | | |
| | $r_{13} = 32.293$ | $d_{13} = 4.8$ | $n_7 = 1.59507$ | $\nu_7 = 35.6$ | $L_{32}$ |
| | $r_{14} = -25.322$ | $d_{14} = 1.0$ | | | |
| | $r_{15} = -25.590$ | $d_{15} = 1.0$ | $n_8 = 1.77279$ | $\nu_8 = 49.4$ | $\left.\begin{matrix}\\\\\end{matrix}\right\} L_{33}$ |
| | $r_{16} = 40.631$ | $d_{16} = 2.75$ | $n_9 = 1.59507$ | $\nu_9 = 35.5$ | |
| | $r_{17} = 136.476$ | $d_{17} = 14.290$ | | | |
| | $r_{18} = 109.029$ | $d_{18} = 1.5$ | $n_{10} = 1.79631$ | $\nu_{10} = 41.0$ | $\left.\begin{matrix}\\\\\end{matrix}\right\} L_{34}$ |
| | $r_{19} = 37.535$ | $d_{19} = 10.0$ | $n_{11} = 1.51823$ | $\nu_{11} = 59.0$ | |
| | $r_{20} = -23.340$ | $d_{20} = 0.1$ | | | |
| | $r_{21} = -87.100$ | $d_{21} = 1$ | $n_{12} = 1.78797$ | $\nu_{12} = 47.5$ | $L_{35}$ |
| | $r_{22} = 83.340$ | | | | |

$f_1 = 280.444$    $f_{12} = 105.00$    $\Delta y/\Delta x = 0.30629$
$f_2 = 79.0025$    $q_1 = 1.012$    $P = 0.00073$
$f_3 = -76.488$    The diaphragm lies 7.5mm ahead of the fourth lens $L_{21}$.

I claim:

1. A lens system capable of continuously effecting infinity photography to high magnification proximity photography, comprising:
   a convergent lens group which is a first group positioned most adjacent to the object side;
   a convergent lens group which is a second group positioned rearwardly of said first group;
   a divergent lens group which is a third group positioned rearwardly of said second group; and
   a diaphragm provided between said first group and said third group;
   said first group and said second group being movable toward the object side relative to said third group while enlarging the spacing between said first and second groups when focusing is effected from infinity to a short distance, and the diaphragm being movable with the second group.

2. A lens system according to claim 1, satisfying the following conditions:

$$1.1 < f/f_{12} < 2.2$$

$$1.7 < f_1/f_{12} < 4.0$$

$$1.6 < f_1/f_2 < 5.0$$

$$0.15 < dy/dx < 0.6$$

where f is the focal length of the entire lens system, $f_1$ and $f_2$ are the focal lengths of said first and said second groups, respectively, $f_{12}$ is the combined focal length of said first and second groups, and dy/dx is the differentiated value of an amount of variation y in the spacing between said first group and said second group to an amount of variation x in the spacing between said second group and said third group, y and x being in a predetermined functional relation.

3. A lens system according to claim 2, wherein said first group has, in succession from the object side, two positive lens components and a negative lens component, said second group has a meniscus lens component having its convex surface facing the image side and a positive lens component, and said third group has at least one negative lens component.

4. A lens system according to claim 3, wherein when $r_1$ and $r_2$ are, respectively, the radii of curvature of the object side surface and the image side surface of the positive lens component in said first group which is most adjacent to the object side, and the shape factor $q_1$ is defined as $(r_2+r_1)/(r_2-r_1)$, said shape factor $q_1$ satisfies the condition that $0.6 < q_1 < 1.3$, and wherein the second positive lens component in said first group is a positive meniscus lens having its convex surface facing the object side, and the negative lens component in said first group is a negative meniscus lens having its convex surface facing the object side.

5. A lens system according to claim 1, wherein numerical data are as follows:

Focal length f = 105 F-number F = 2.8
Angle of view 2ω = 23.25° $d_0 = \infty \sim 254.9907$

| | | | | | |
|---|---|---|---|---|---|
| First Group $G_1$ | $r_1 = 74,500$ | $d_1 = 5.0$ | $n_1 = 1.77279$ | $\nu_1 = 49.4$ | $L_{11}$ |
| | $r_2 = -1042,700$ | $d_2 = 0.15$ | | | |
| | $r_3 = 29,000$ | $d_3 = 5.0$ | $n_2 = 1.71700$ | $\nu_2 = 48.1$ | $L_{12}$ |
| | $r_4 = 57,000$ | $d_4 = 2.0$ | | | |
| | $r_5 = 91,280$ | $d_5 = 2.0$ | $n_3 = 1.74950$ | $\nu_3 = 35.2$ | $L_{13}$ |
| | $r_6 = 24,131$ | $d_6 = 13.9866 \sim 20.6820$ | | | |
| | $r_7 = -31,190$ | $d_7 = 2.0$ | $n_4 = 1.68893$ | $\nu_4 = 31.1$ | |

-continued

Focal length f = 105  F-number F = 2.8
Angle of view 2ω = 23.25°  d₀ = ∞ ~ 254.9907

| | | | | | |
|---|---|---|---|---|---|
| Second Group G₂ | $r_8 = 300,000$ | $d_8 = 10.5$ | $n_5 = 1.73350$ | $\nu_5 = 51.1$ | $L_{21}$ |
| | $r_9 = -41,983$ | $d_9 = 3.0$ | | | |
| | $r_{10} = 310,300$ | $d_{10} = 5.0$ | $n_6 = 1.69350$ | $\nu_6 = 53.8$ | $L_{22}$ |
| | $r_{11} = -70,248$ | $d_{11} = 8.1258 \sim 34.3666$ | | | |
| | $r_{12} = -191,637$ | $d_{12} = 4.0$ | $n_7 = 1.59507$ | $\nu_7 = 35.5$ | $L_{31}$ |
| | $r_{13} = -55,637$ | $d_{13} = 2.0$ | | | |
| | $r_{14} = -114,216$ | $d_{14} = 1.8$ | $n_8 = 1.79668$ | $\nu_8 = 45.5$ | $L_{32}$ |
| Third Group G₃ | $r_{15} = 50,880$ | $d_{15} = 1.8$ | | | |
| | $r_{16} = 45,690$ | $d_{16} = 6.0$ | $n_9 = 1.59507$ | $\nu_9 = 35.5$ | $L_{33}$ |
| | $r_{17} = -175,850$ | $d_{17} = 4.6$ | | | |
| | $r_{18} = -38,545$ | $d_{18} = 2.0$ | $n_{10} = 1.80454$ | $\nu_{10} = 39.6$ | $L_{34}$ |
| | $r_{19} = -77,213$ | | | | |
| | $f_1 = 153,000$ | $f_{12} = 75.0$ | $\Delta y/\Delta x = 0.25515$ | | |
| | $f_2 = 80,769$ | $q_1 = 0.867$ | $P = 0.00114$ | | |
| | $f_3 = -118,525$ | The diaphragm lies 1.5mm ahead of the fifth lens $L_{22}$; | | | | where $r_1, r_2, r_3, \ldots$ represent the radii of curvature of the successive lens surfaces from the object side, $d_1, d_2, d_3, \ldots$ represent the center thicknesses and air spaces of the respective lenses, and $n_1, n_2, \ldots$ and $\nu_1, \nu_2, \ldots$ represent the refractive indices and Abbe numbers, respectively, of the respective lenses, $f_1$, $f_2$ and $f_3$ are the focal lengths of the first, second and third groups, respectively, $f_{12}$ is the combined focal length of the first and second groups, $\Delta y/\Delta x$ is the average variation rate of an amount of variation y in the spacing between the first and second groups to an amount of variation x in the spacing between the second and third groups, $d_0$ is the object distance, P is the Petzval sum of the entire system, and $q_1$ is the shape factor defined as $(r_2+r_1)/(r_2-r_1)$.

6. A lens system according to claim 1, wherein numerical data are as follows:

where $r_1, r_2, r_3, \ldots$ represent the radii of curvature of the successive lens surfaces from the object side, $d_1, d_2, d_3, \ldots$ represent the center thicknesses and air spaces of the respective lenses, and $n_1, n_2, \ldots$ and $\nu_1, \nu_2, \ldots$ represent the refractive indices and Abbe numbers, respectively, of the respective lenses, $f_1$, $f_2$ and $f_3$ are the focal lengths of the first, second and third groups, respectively, $f_{12}$ is the combined focal length of the first and second groups, $\Delta y/\Delta x$ is the average variation rate of an amount of variation y in the spacing between the first and second groups to an amount of variations x in the spacing between the second and third groups, $d_0$ is the object distance, P is the Petzval sum of the entire system, and $q_1$ is the shape factor defined as $(r_2+r_1)/(r_2-r_1)$.

7. A lens system according to claim 1, wherein numerical data are as follows:

Focal length f = 105.187  F-number F = 2.8
Angle of view 2ω = 23.21°  d₀ = ∞ ~ 265.1865

| | | | | | |
|---|---|---|---|---|---|
| First Group G₁ | $r_1 = 107.669$ | $d_1 = 4.15$ | $n_1 = 1.76684$ | $\nu_1 = 46.8$ | $L_{11}$ |
| | $r_2 = -533.176$ | $d_2 = 0.7$ | | | |
| | $r_3 = 29.357$ | $d_3 = 6.7$ | $n_3 = 1.79668$ | $\nu_3 = 45.5$ | $L_{12}$ |
| | $r_4 = 84.686$ | $d_4 = 2.05$ | | | |
| | $r_5 = 204.175$ | $d_5 = 3.3$ | $n_3 = 1.75520$ | $\nu_3 = 27.6$ | $L_{13}$ |
| | $r_6 = 23.623$ | $d_6 = 14.4023 \sim 21.0977$ | | | |
| Second Group G₂ | $r_7 = -82.105$ | $d_7 = 2.3$ | $n_4 = 1.75520$ | $\nu_4 = 27.6$ | $L_{21}$ |
| | $r_8 = 26.484$ | $d_8 = 9.1$ | $n_5 = 1.76684$ | $\nu_5 = 46.8$ | |
| | $r_9 = -64.715$ | $d_9 = 3.0$ | | | |
| | $r_{10} = -7971.249$ | $d_{10} = 4.3$ | $n_6 = 1.71300$ | $\nu_6 = 54$ | $L_{22}$ |
| | $r_{11} = -84.941$ | $d_{11} = 4.8129 \sim 31.0537$ | | | |
| Third Group G₃ | $r_{12} = -822.692$ | $d_{12} = 4.0$ | $n_7 = 1.59507$ | $\nu_7 = 35.5$ | $L_{31}$ |
| | $r_{13} = -35.108$ | $d_{13} = 2.0$ | | | |
| | $r_{14} = -32.776$ | $d_{14} = 1.8$ | $n_8 = 1.79668$ | $\nu_8 = 45.5$ | $L_{32}$ |
| | $r_{15} = 51.278$ | $d_{15} = 1.8$ | | | |
| | $r_{16} = 43.213$ | $d_{16} = 5.0$ | $n_9 = 1.59507$ | $\nu_9 = 35.5$ | $L_{33}$ |
| | $r_{17} = 168888.708$ | | | | |
| | $f_1 = 153.00$ | $f_{12} = 75.0$ | $\Delta y/\Delta x = 0.25515$ | | |
| | $f_2 = 80.769$ | $q_1 = 0.664$ | $P = 0.00169$ | | |
| | $f_3 = -118.00$ | The diaphragm lies 1.5mm ahead of the fifth lens $L_{22}$; | | | |

Focal length f = 105.187  F-number F = 2.8
Angle of view 2ω = 23.21°  d₀ = ∞ ~ 268.6618

| | | | | | |
|---|---|---|---|---|---|
| First Group G₁ | $r_1 = 78.231$ | $d_1 = 4.15$ | $n_1 = 1.76684$ | $\nu_1 = 46.8$ | $L_{11}$ |
| | $r_2 = 663.375$ | $d_2 = 0.7$ | | | |
| | $r_3 = 31.990$ | $d_3 = 6.7$ | $n_2 = 1.76684$ | $\nu_2 = 46.8$ | $L_{12}$ |
| | $r_4 = 79.989$ | $d_4 = 4.0$ | $n_3 = 1.58267$ | $\nu_3 = 46.5$ | $L'_{12}$ |
| | $r_5 = -177.053$ | $d_5 = 3.3$ | $n_4 = 1.75520$ | $\nu_4 = 27.6$ | $L_{13}$ |
| | $r_6 = 23.920$ | $d_6 = 9.8444 \sim 16.5398$ | | | |
| | $r_7 = -43.896$ | $d_7 = 8.0$ | $n_5 = 1.67003$ | $\nu_5 = 47.1$ | $L_{21}$ |

-continued

| | Focal length f = 105.187 F-number F = 2.8 Angle of view 2ω = 23.21° $d_0 = \infty \sim 268.6618$ | | | | |
|---|---|---|---|---|---|
| Second Group $G_2$ | $r_8 = -58.056$ | $d_8 = 3.0$ | | | |
| | $r_9 = 309.188$ | $d_9 = 2.0$ | $n_6 = 1.71736$ | $\nu_6 = 29.5$ | $L_{22}$ |
| | $r_{10} = 63.787$ | $d_{10} = 4.0$ | $n_7 = 1.73350$ | $\nu_7 = 51.1$ | |
| | $r_{11} = -63.636$ | $d_{11} = 2.5291 \sim 28.7699$ | | | |
| Third Group $G_3$ | $r_{12} = -111.194$ | $d_{12} = 4.0$ | $n_8 = 1.66755$ | $\nu_8 = 42.0$ | $L_{31}$ |
| | $r_{13} = -53.353$ | $d_{13} = 2.0$ | | | |
| | $r_{14} = -113.983$ | $d_{14} = 1.8$ | $n_9 = 1.80218$ | $\nu_9 = 44.7$ | $L_{32}$ |
| | $r_{15} = 45.948$ | $d_{15} = 1.8$ | | | |
| | $r_{16} = 41.777$ | $d_{16} = 6.0$ | $n_{10} = 1.66446$ | $\nu_{10} = 35.9$ | $L_{33}$ |
| | $r_{17} = -130.887$ | $d_{17} = 4.6$ | | | |
| | $r_{18} = -40.915$ | $d_{18} = 2.0$ | $n_{11} = 1.79631$ | $\nu_{11} = 41$ | $L_{34}$ |
| | $r_{19} = -109.967$ | | | | |
| | $f_1 = 153.0$ | $f_{12} = 75.0$ | $\Delta y/\Delta x = 0.25515$ | | |
| | $f_2 = 80.769$ | $q_1 = 1.267$ | $P = 0.00127$ | | |
| | $f_3 = -118.00$ | The diaphragm lies 1.5mm ahead of the sixth lens $L_{22}$; | | | | where $r_1, r_2, r_3, \ldots$ represent the radii of curvature of the successive lens surfaces from the object side, $d_1, d_2, d_3, \ldots$ represent the center thicknesses and air spaces of the respective lenses, and $n_1, n_2, \ldots$ and $\nu_1, \nu_2, \ldots$ represent the refractive indices and Abbe numbers, respectively, of the respective lenses, $f_1, f_2$ and $f_3$ are the focal lengths of the first, second and third groups, respectively, $f_{12}$ is the combined focal length of the first and second groups, $\Delta y/\Delta x$ is the average variation rate of an amount of variation y in the spacing between the first and second groups to an amount of variation x in the spacing between the second and third groups, $d_0$ is the object distance, P is the Petzval sum of the entire system, and $q_1$ is the shape factor defined as $(r_2+r_1)/(r_2-r_1)$.

8. A lens system according to claim 1, wherein numerical data are as follows:

where $r_1, r_2, r_3, \ldots$ represent the radii of curvature of the successive lens surfaces from the object side, $d_1, d_2, d_3, \ldots$ represent the center thicknesses and air spaces of the respective lenses, and $n_1, n_2, \ldots$ and $\nu_1, \nu_2, \ldots$ represent the refractive indices and Abbe numbers, respectively, of the respective lenses, $f_1, f_2$ and $f_3$ are the focal lengths of the first, second and third groups, respectively, $f_{12}$ is the combined focal length of the first and second groups, $\Delta y/\Delta x$ is the average variation rate of an amount of variation y in the spacing between the first and second groups to an amount of variation x in the spacing between the second and third groups, $d_0$ is the object distance, P is the Petzval sum of the entire system, and $q_1$ is the shape factor defined as $(r_2+r_1)/(r_2-r_1)$.

9. A lens system according to claim 1, wherein numerical data are as follows:

| | Focal length f = 105.0 F-number F = 2.8 Angle of view 2ω = 23.25° $d_0 = \infty \sim 149.1795$ | | | | |
|---|---|---|---|---|---|
| First Group $G_1$ | $r_1 = 99.370$ | $d_1 = 4.5$ | $n_1 = 1.77279$ | $\nu_1 = 49.4$ | $L_{11}$ |
| | $r_2 = -682.579$ | $d_2 = 0.1$ | | | |
| | $r_3 = 37.643$ | $d_3 = 4.5$ | $n_2 = 1.77279$ | $\nu_2 = 49.4$ | $L_{12}$ |
| | $r_4 = 60.158$ | $d_4 = 4.0$ | | | |
| | $r_5 = -2018.698$ | $d_5 = 2.0$ | $n_3 = 1.69895$ | $\nu_3 = 80.1$ | $L'_{12}$ |
| | $r_6 = 39.556$ | $d_6 = 5.0$ | $n_4 = 1.79631$ | $\nu_4 = 39.6$ | |
| | $r_7 = 159.067$ | $d_7 = 0.1$ | | | |
| | $r_8 = 51.905$ | $d_8 = 2.0$ | $n_5 = 1.59507$ | $\nu_5 = 35.5$ | $L_{13}$ |
| | $r_9 = 24.944$ | $d_9 = 12.347 \sim 26.347$ | | | |
| Second Group $G_2$ | $r_{10} = -30.955$ | $d_{10} = 1.5$ | $n_6 = 1.64831$ | $\nu_6 = 33.8$ | $L_{21}$ |
| | $r_{11} = 251.790$ | $d_{12} = 9.1$ | $n_7 = 1.80411$ | $\nu_7 = 46.4$ | |
| | $r_{12} = -39.137$ | $d_{12} = 0.1$ | | | |
| | $r_{13} = 5315.299$ | $d_{13} = 4.3$ | $n_8 = 1.80411$ | $\nu_8 = 46.4$ | $L_{22}$ |
| | $r_{14} = -94.504$ | $d_{14} = 1.4438 \sim 56.3132$ | | | |
| Third Group $G_3$ | $r_{15} = 121.0$ | $d_{15} = 4.0$ | $n_9 = 1.59507$ | $\nu_9 = 35.5$ | $L_{31}$ |
| | $r_{16} = -100.350$ | $d_{16} = 2.0$ | | | |
| | $r_{17} = -118.300$ | $d_{17} = 1.8$ | $n_{10} = 1.79668$ | $\nu_{10} = 45.5$ | $L_{32}$ |
| | $r_{18} = 35.5$ | $d_{18} = 1.8$ | | | |
| | $r_{19} = 36.77$ | $d_{19} = 6.0$ | $n_{11} = 1.59507$ | $\nu_{11} = 35.5$ | $L_{33}$ |
| | $r_{20} = -5164.00$ | $d_{20} = 4.6$ | | | |
| | $r_{21} = -100.00$ | $d_{21} = 1.5$ | $n_{12} = 1.79668$ | $12 = 45.5$ | $L_{34}$ |
| | $r_{22} = 70.000$ | $d_{22} = 0.2$ | | | |
| | $r_{23} = 54.000$ | $d_{23} = 9$ | $n_{13} = 1.51009$ | $\nu_{13} = 63.4$ | $L_{35}$ |
| | $r_{24} = -179.445$ | | | | |
| | $f_1 = 153.0$ | $f_{12} = 5.0$ | $\Delta y/\Delta x = 0.25515$ | | |
| | $f_2 = 80.769$ | $q_1 = 0.746$ | $P = 0.00125$ | | |
| | $f_3 = -125.525$ | The diaphragm lies 4mm ahead of the fifth lens $L_{21}$; | | | |

| | focal length f = 105.0 F-number F = 2.6 Angle of view 2ω = 23.25° d₀ = ∞ ~261.408 | | | | |
|---|---|---|---|---|---|
| First Group G₁ | $r_1$ = 122.568 | $d_1$ = 6.08 | $n_1$ = 1.77279 | $v_1$ = 49.4 | $L_{11}$ |
| | $r_2$ = −2677.350 | $d_2$ = 0.19 | | | |
| | $r_3$ = 40.437 | $d_3$ = 10.118 | $n_2$ = 1.84042 | $v_2$ = 43.3 | $L_{12}$ |
| | $r_4$ = 93.003 | $d_4$ = 1.9 | | | |
| | $r_5$ = 194.456 | $d_5$ = 2.850 | $n_3$ = 1.75692 | $v_3$ = 31.7 | $L_{13}$ |
| | $r_6$ = 31.060 | $d_6$ = 14.501~29.796 | | | |
| Second Group G₂ | $r_7$ = −35.650 | $d_7$ = 1.853 | $n_4$ = 1.71736 | $v_4$ = 29.5 | $L_{21}$ |
| | $r_8$ = ∞ | $d_8$ = 9.738 | $n_5$ = 1.78797 | $v_5$ = 47.5 | |
| | $r_9$ = −43.010 | $d_9$ = 0.19 | | | |
| | $r_{10}$ = 1009.388 | $d_{10}$ = 7.790 | $n_6$ = 1.84042 | $v_6$ = 43.3 | $L_{22}$ |
| | $r_{11}$ = −105.762 | $d_{11}$ = 3.043~48.715 | | | |
| Third Group G₃ | $r_{12}$ = 244.557 | $d_{12}$ = 2.0 | $n_7$ = 1.46450 | $v_7$ = 65.8 | $L_{31}$ |
| | $r_{13}$ = 137.036 | | | | |
| | $f_1$ = 246.031 | $f_{12}$ = 95.0 | Δy/Δx = 0.33489 | | |
| | $f_2$ = 95.399 | $q_1$ = 0.912 | P = 0.00073 | | |
| | $f_3$ = −675.00 | The diaphragm lies 4.75mm ahead of the fourth lens $L_{21}$; | | | | where $r_1, r_2, r_3, \ldots$ represent the radii of curvature of the successive lens surfaces from the object side, $d_1, d_2, d_3, \ldots$ represent the center thicknesses and air spaces of the respective lenses, and $n_1, n_2, \ldots$ and $v_1, v_2, \ldots$ represent the refractive indices and Abbe numbers, respectively, of the respective lenses, $f_1, f_2$ and $f_3$ are the focal lengths of the first, second and third groups, respectively, $f_{12}$ is the combined focal length of the first and second groups, Δy/Δx is the average variation rate of an amount of variation y in the spacing between the first and second groups to an amount of variation x in the spacing between the second and third groups, $d_0$ is the object distance, P is the Petzval sum of the entire system, and $q_1$ is the shape factor defined as $(r_2+r_1)/(r_2-r_1)$.

10. A lens system according to claim 1, wherein numerical data are as follows:

| | Focal length F = 210.0 F-number F = 4.5 Angle of view 2ω = 11.75° d₀ = ∞ ~479.6208 | | | | |
|---|---|---|---|---|---|
| First Group G₁ | $r_1$ = 56.301 | $d_1$ = 9.5 | $n_1$ = 1.69680 | $v_1$ = 55.6 | $L_{11}$ |
| | $r_2$ = 9668.693 | $d_2$ = 3.1 | | | |
| | $r_3$ = 42.374 | $d_3$ = 11.5 | $n_2$ = 1.62041 | $v_2$ = 60.3 | $L_{12}$ |
| | $r_4$ = 68.455 | $d_4$ = 2.5 | | | |
| | $r_5$ = 3944.716 | $d_5$ = 5.6 | $n_3$ = 1.72825 | $v_3$ = 28.3 | $L_{13}$ |
| | $r_6$ = 28.393 | $d_6$ = 25.716~33.716 | | | |
| Second Group G₂ | $r_7$ = −41.143 | $d_7$ = 3.9 | $n_4$ = 1.59551 | $v_4$ = 39.2 | $L_{21}$ |
| | $r_8$ = −48.910 | $d_8$ = 4.1 | | | |
| | $r_9$ = 165.842 | $d_9$ = 5.0 | $n_5$ = 1.73350 | $v_5$ = 51.1 | $L_{22}$ |
| | $r_{10}$ = −76.597 | $d_{10}$ = 13.830~39.948 | | | |
| Third Group G₃ | $r_{11}$ = 35.545 | $d_{11}$ = 1.0 | $n_6$ = 1.79668 | $v_6$ = 45.5 | $L_{31}$ |
| | $r_{12}$ = 17.780 | $d_{12}$ = 1.8 | | | |
| | $r_{13}$ = 32.293 | $d_{13}$ = 4.8 | $n_7$ = 1.59507 | $v_7$ = 35.6 | $L_{32}$ |
| | $r_{14}$ = −25.322 | $d_{14}$ = 1.0 | | | |
| | $r_{15}$ = −25.590 | $d_{15}$ = 1.0 | $n_8$ = 1.77279 | $v_8$ = 49.4 | $L_{33}$ |
| | $r_{16}$ = 40.631 | $d_{16}$ = 2.75 | $n_9$ = 1.59507 | $v_9$ = 35.5 | |
| | $r_{17}$ = 136.476 | $d_{17}$ = 14.290 | | | |
| | $r_{18}$ = 109.029 | $d_{18}$ = 1.5 | $n_{10}$ = 1.79631 | $v_{10}$ = 41.0 | $L_{34}$ |
| | $r_{19}$ = 37.535 | $d_{19}$ = 10.0 | $n_{11}$ = 1.51823 | $v_{11}$ = 59.0 | |
| | $r_{20}$ = −23.340 | $d_{20}$ = 0.1 | | | |
| | $r_{21}$ = −87.100 | $d_{21}$ = 1 | $n_{12}$ = 1.78797 | $v_{12}$ = 47.5 | $L_{35}$ |
| | $r_{22}$ = 83.340 | | | | |
| | $f_1$ = 280.444 | $f_{12}$ = 105.00 | Δy/Δx = 0.30629 | | |
| | $f_2$ = 79.0025 | $q_1$ = 1.012 | P = 0.00073 | | |
| | $f_3$ = −76.488 | The diaphragm lies 7.5mm ahead of the fourth lens $L_{21}$; | | | | where $r_1, r_2, r_3, \ldots$ represent the radii of curvature of the successive lens surfaces from the object side, $d_1, d_2, d_3, \ldots$ represent the center thicknesses and air spaces of the respective lenses, and $n_1, n_2, \ldots$ and $v_1, v_2, \ldots$ represent the refractive indices and Abbe numbers, respectively, of the respective lenses, $f_1, f_2$ and $f_3$ are the focal lengths of the first, second and third groups, respectively, $f_{12}$ is the combined focal length of the first and second groups, Δy/Δx is the average variation rate of an amount of variation y in the spacing between the first and second groups to an amount of variation x in the spacing between the second and third groups, $d_0$ is the object distance, P is the Petzval sum of the entire system, and $q_1$ is the shape factor defined as $(r_2+r_1)/(r_2-r_1)$.

* * * * *